Aug. 9, 1960 R. J. BERTI ET AL 2,948,881

DISPLAY SWITCHING SYSTEMS AND APPARATUS THEREFOR

Filed Dec. 13, 1954 15 Sheets-Sheet 1

INVENTORS.
Roland J. Berti &
David C. Bettison
By:-
Mann, Brown and Hansmann
Attys.

Fig-2
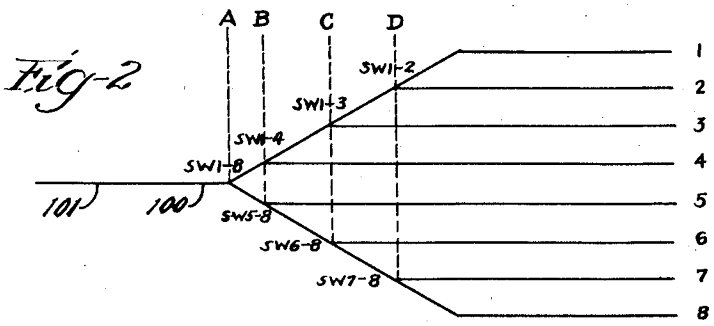
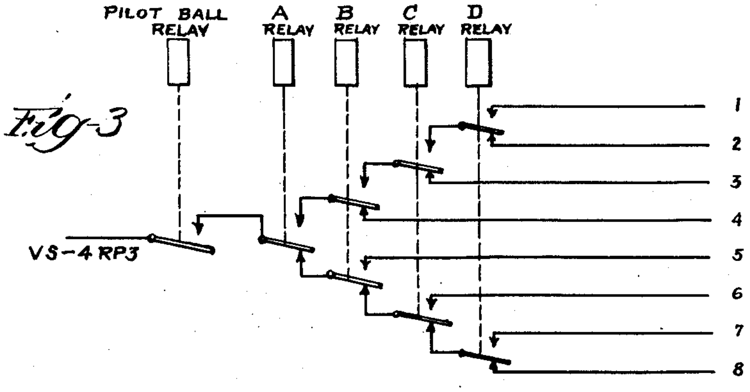
Fig-3
Fig-4
| TR | PILOT | A | B | C | D |
|---|---|---|---|---|---|
| 1 | X | X | X | X | X |
| 2 | X | X | X | X | |
| 3 | X | X | X | | |
| 4 | X | X | | | |
| 5 | X | | X | | |
| 6 | X | | | X | |
| 7 | X | | | | X |
| 8 | X | | | | |
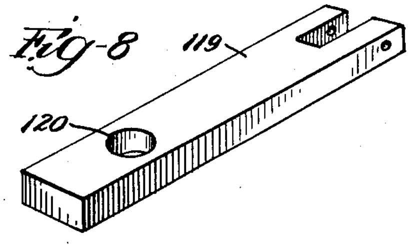
Fig-8
INVENTORS.
Roland J. Berti &
David C. Bettison
By:-
Mann, Brown and Hansmann
Attys.

DISPLAY SWITCHING SYSTEMS AND APPARATUS THEREFOR

INVENTORS.
Roland J. Berti &
David C. Bettison
By:-
Mann, Brown and Hansmann
Attys.

DISPLAY SWITCHING SYSTEMS AND APPARATUS THEREFOR

INVENTORS.
Roland J. Berti &
David C. Bettison
By:-
Mann, Brown and Hanssmann
Attys.

DISPLAY SWITCHING SYSTEMS AND APPARATUS THEREFOR

Filed Dec. 13, 1954 15 Sheets-Sheet 5

INVENTORS
Roland J. Berti &
David C. Bettison
By:-
Mann, Brown and Hansmann
Atty.

Aug. 9, 1960 R. J. BERTI ET AL 2,948,881

DISPLAY SWITCHING SYSTEMS AND APPARATUS THEREFOR

Filed Dec. 13, 1954 15 Sheets-Sheet 6

INVENTORS
Roland J. Berti &
David C. Bettison
By:
Mann, Brown and Hansmann
Attys.

DISPLAY SWITCHING SYSTEMS AND APPARATUS THEREFOR

Filed Dec. 13, 1954 15 Sheets-Sheet 7

INVENTORS.
Roland J. Berti &
David C. Bettison
By:-
Mann, Brown and Hansmann
Attys.

DISPLAY SWITCHING SYSTEMS AND APPARATUS THEREFOR

Filed Dec. 13, 1954 15 Sheets-Sheet 8

INVENTORS
Roland J. Berti &
David C. Bettison
By:-
Mann, Brown and Hansmann
Attys.

DISPLAY SWITCHING SYSTEMS AND APPARATUS THEREFOR

Filed Dec. 13, 1954 15 Sheets-Sheet 9

INVENTORS.
Roland J. Berti &
David C. Bettison
By:-
Mann, Brown and Hansmann
Attys.

DISPLAY SWITCHING SYSTEMS AND APPARATUS THEREFOR

Filed Dec. 13, 1954 15 Sheets-Sheet 10

INVENTORS.
Roland J. Berti &
David C. Bettison
By:-
Mann, Brown and Hansmann
Att'ys.

INVENTORS.
Roland J. Berti &
David C. Bettison
By:-
Mann, Brown and Hansmann
Attys.

TO FIG.27B

INVENTORS.
Roland J. Berti &
David C. Bettison
By:-
Mann, Brown and Hansmann
Attys.

INVENTORS.
Roland J. Berti &
David C. Bettison
By:-
Mann, Brown and Hansmann
Attys.

Aug. 9, 1960 R. J. BERTI ET AL 2,948,881

DISPLAY SWITCHING SYSTEMS AND APPARATUS THEREFOR

Filed Dec. 13, 1954

15 Sheets-Sheet 14

INVENTORS.
Roland J. Berti &
David C. Bettison
By:-
Mann, Brown and Hansmann
Att'ys INVENTORS.
Roland J. Berti +
David C. Bettison
By:-
Mann, Brown and Hansmann
Attys.

United States Patent Office 2,948,881 Patented Aug. 9, 1960

2,948,881

DISPLAY SWITCHING SYSTEMS AND APPARATUS THEREFOR

Roland J. Berti, 1019 S. 55th St., Omaha 6, Nebr., and David C. Bettison, 4903 Cass St., Omaha, Nebr.

Filed Dec. 13, 1954, Ser. No. 474,668

13 Claims. (Cl. 340—23)

This invention relates to switching systems and apparatus therefor and more particularly is concerned with apparatus for automatically controlling the track switches of a railway classification yard or hump yard system. This invention further contemplates an arrangement for storing control intelligence in the apparatus and for indicating portions of the stored intelligence.

A railway classification yard or hump yard is a storage area wherein railway cars are classified and stored in accordance with their ultimate destinations. Thus, cars destined for point A are stored on a single track, cars destined for point B are stored on a separate single track, and so on. The yard is composed of a single entrance track that passes over a hump or a hill and then branches out through an appropriate number of track switches and branch sections of track into a large number of storage tracks.

In the classification process the cars are successively moved along the single entrance track, permitted to run down the hump by gravity in close succession, and then selectively guided to their respective storage tracks, as determined by their ultimate destination. It has long been recognized that the frequent switching operations required at each of the switch points in the yard layout renders manual methods of control too costly and slow, and accordingly several types of automatic control apparatus have been developed and employed.

One such prior art system is shown in the Brixner et al. Patent No. 2,194,352 which discloses an automatic storage and control system employing a plurality of individual train describer units at each of the major switch points of the yard layout. Each train describer unit comprises a plurality of storage relays that are adapted to assume individual patterns of energization and de-energization for each track destination desired. Each train describer unit is able to store a single destination, and thus the number of units required is determined by the number of car destinations to be stored. The various describer units at each switch point are connected in step-by-step relationship so that control intelligence may be stored at each switch point and advanced through the relay system as the preceding unit of intelligence becomes operative and passes to the next point of the system.

As the car progresses along the route to its storage track, the operative train describer unit throws its associated track switch in the prescribed direction as determined by the condition of energization of its storage relays, and repeater contacts on relays associated with each such switch then close circuits for transmitting the stored information in that train describer unit to the train describer units associated with the succeeding switch point in the route selected.

The present invention offers numerous operating advantages over these prior art arrangements and the present improvements are believed important and necessary in any complex classification apparatus.

When a train is to be classified, it is desirable to be able to record the destination for each of the cars in a single operation, and due to the length of modern freight trains, this often requires the storage of more than a hundred car destinations. In all known commercial embodiments involving storage relays, the memory system portion of the apparatus is able to store only five car destinations with the result that the humpmaster must continually refer to the master sheet for the train being classified and set up successive increments of the train as the system proceeds to use up the destinations then in the machine. It is, of course, possible to make provision for storing more than five destinations but the cost and size of the device becomes prohibitive.

During the classification process, it frequently is necessary to reroute a car after its original route has been recorded in the automatic storage and control apparatus. This may occur either due to an error in originally classifying it or more frequently because it is found to be in need of repair. Usually one of the storage tracks is a repair track and all cars needing repairs are routed to this track regardless of their ultimate destination. In most hump yards, an inspection pit is situated immediately before the hump so that cars in need of repair may be discovered and rerouted before passing over the hump.

In these instances it is necessary to cancel the routing originally recorded in the control apparatus for the car in question and substitute a new routing. Variations of this problem may also arise in that a particular car may be omitted when setting up the original routings with the result that its routing must later be inserted or a car destination may inadvertently be recorded twice and, hence, one such recording must later be cancelled. In the prior art devices employing storage relays in the memory system, it has not been possible to selectively cancel out or substitute at an intermediate point but, rather, all subsequently recorded destinations must first be cancelled and, after the necessary corrective action, must then be reinserted.

The present invention seeks to overcome the above limitations of the prior art devices and has for its principal object the provision, in control apparatus for automatic switching systems, of one or more of the following features or attributes: Means for representing the control intelligence by selected permutations of mechanical elements each of which has one of two distinctive physical characteristics; means for forming the desired code groups; means for verifying that the code group selected corresponds to the destination desired, including means for dumping any erroneous code groups; means for storing a plurality of code groups to permit a plurality of car destinations to be recorded simultaneously; means for indicating the destinations represented by certain of the stored code groups; means for individually cancelling and/or substituting one or more code groups in the storage sections; and means comprising a series of control levels that may be correlated with the switch levels of the track layout, whereby the code groups progress through the control apparatus in timed relation with the progress of the cars through the classification yard.

In accordance with the invention, it is proposed to employ gravtiy actuated, free rolling elements each of which has one of two distinctive physical characteristics, and it is proposed to arrange these elements within a plurality of tubes, whereby a plurality of code groups may be maintained in their correct permutational arrangement within the storage devices. It is further proposed to permit the code groups within the indicating portion of the storage apparatus to be cancelled and/or substituted as desired.

In addition, the present invention contemplates the use to the maximum extent possible of existing signalling and switching equipment of classification yards such as the track circuits and switch machine control circuitry and is particularly adapted for use in conjunction with automatic control systems for car retarders.

It is further proposed to provide a mechanical control system in lieu of electrical storage relays and thereby offer the advantages of increased operating flexibility and lower cost. The mechanical system is capable of use with any size classification yard and many of the basic components are of identical construction permitting necessary expansion at a minimum of cost.

The invention contemplates the provision of a large storage capacity to permit the humpmaster to record and store the classification routes for an entire train during a single operation and thus devote his undivided attention to supervising the actual classification operation. Furthermore, the system may be provided with a large storage capacity merely by increasing the size of the storage containers for the mechanical elements whereas in the electrical relay systems an additional bank of relays is required for each additional unit of storage.

Other objects and advantages of the invention will be apparent during the course of the following description.

In the accompanying drawings forming a part of this specification and in which like numerals are employed to designate like parts throughout the same, Fig. 1 is a block diagram representing the arrangement of the general system of the present invention;

Fig. 2 is a one-line diagram of the track layout of a typical classification yard;

Fig. 3 is a relay tree circuit corresponding to the track layout of Fig. 2;

Fig. 4 is a code chart illustrating the combinations and permutations of code elements necessary to describe the various classification routes in the track layout of Fig. 2;

Fig. 8 is a perspective view of a selector shuttle;

Figure 27A:
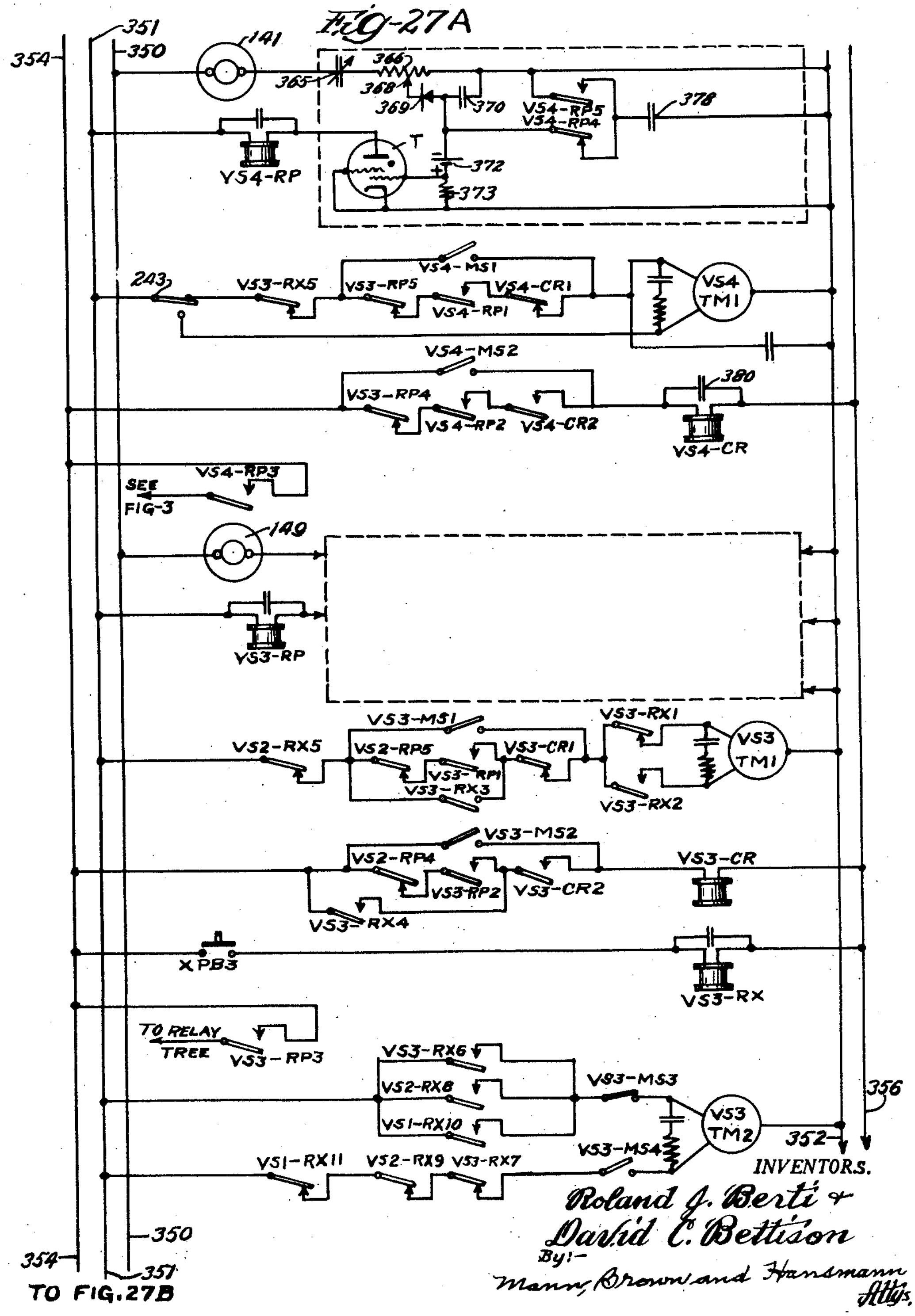

Figs. 27A and B illustrate the cascading control circuitry of the visible storage section.

Figure 29:
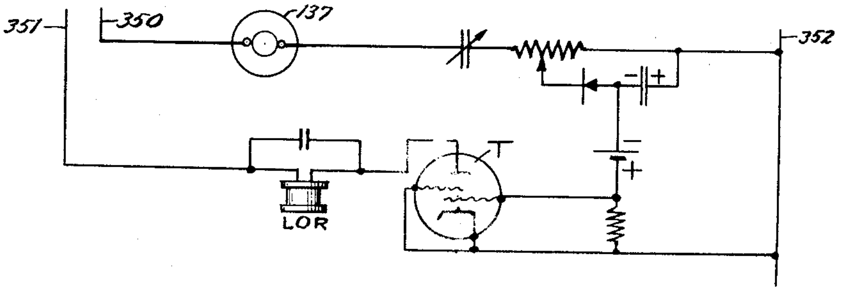
Figure 30:
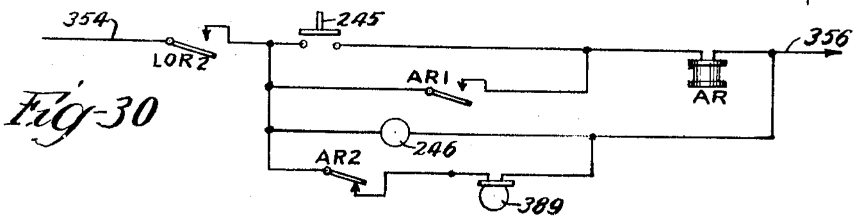
Figure 28:
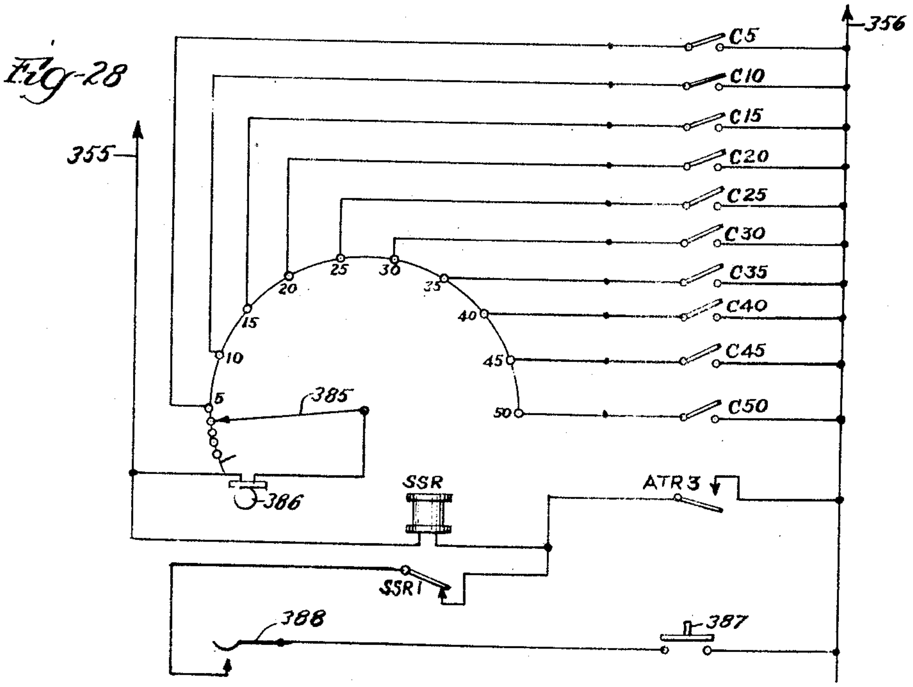
Figure 31:
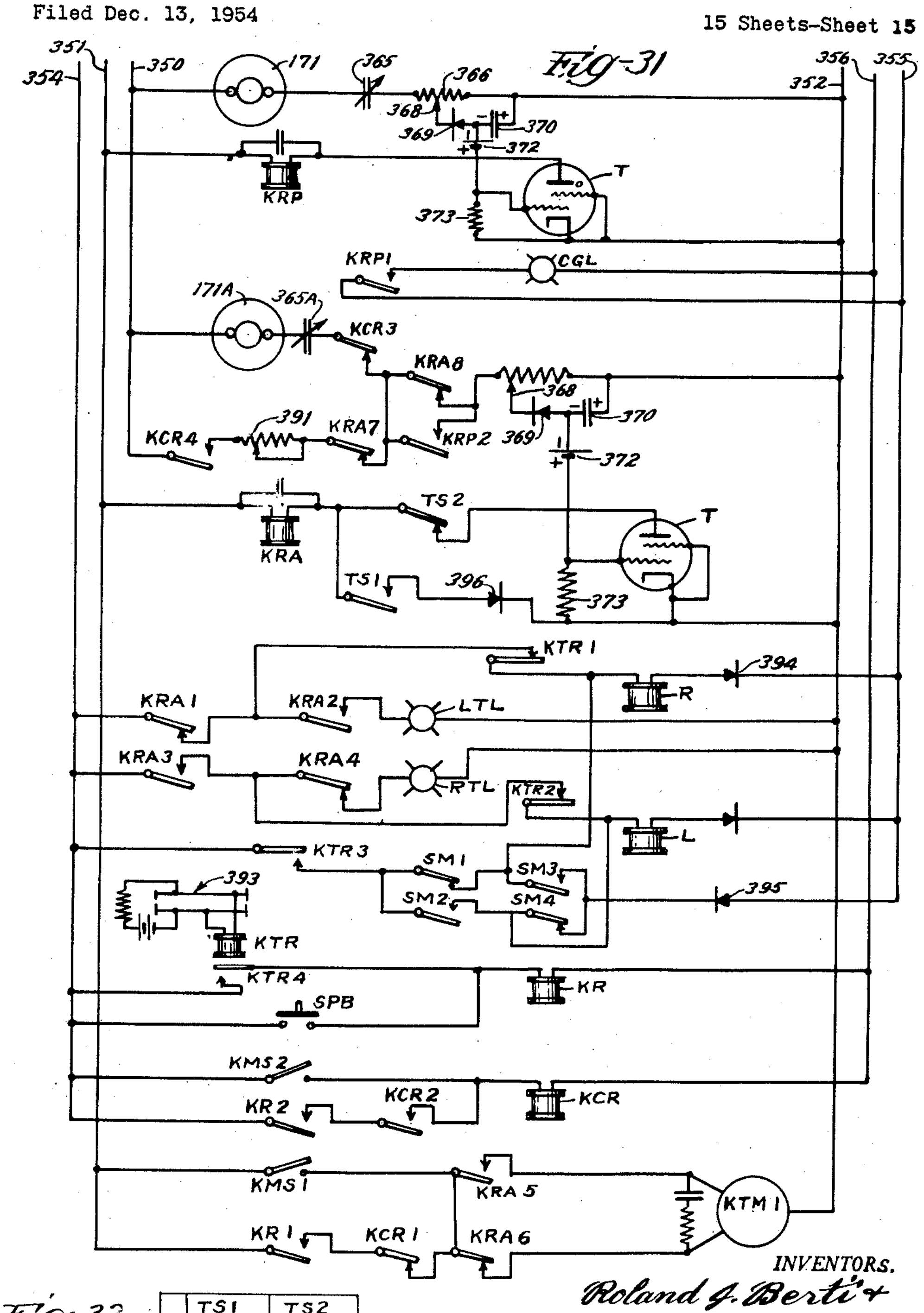
Figure 32:
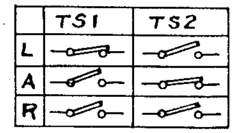

Fig. 28 is a diagram of the reminder circuitry associated with the blind storage section;

Figs. 29 and 30 are diagrams of the full code warning circuitry associated with the blind storage section; and Figs. 31 and 32 are diagrams of the track switch control circuitry.

GENERAL SYSTEM

The present invention recognizes that each storage track in a railroad classification yard can be described in terms of the switch points through which a car must pass in reaching that track. At each switch point the track switch may assume one of two positions, and therefore each switch point in the classification route of any given car may be represented by an element having one of two different physical characteristics. For instance, if the switch is to be thrown to the right, then an element having a certain characteristic is employed, whereas if the switch is to be thrown to the left, then an element having a different characteristic is employed.

In order to describe a particular storage track, it is necessary to provide a permutational group of elements equal in number to the number of switch points traversed by the car and differing in physical characteristics according to the position which each track switch must assume. In the present invention it has been found most advantageous to employ mechanical elements for this purpose and more particularly to employ flowable mechanical elements such as balls. In the preferred form, metallic balls and non-metallic balls provide the necessary distinguishing characteristics, but this specific disclosure is not intended to limit the broad scope of the general system of the present invention.

Figure 1:
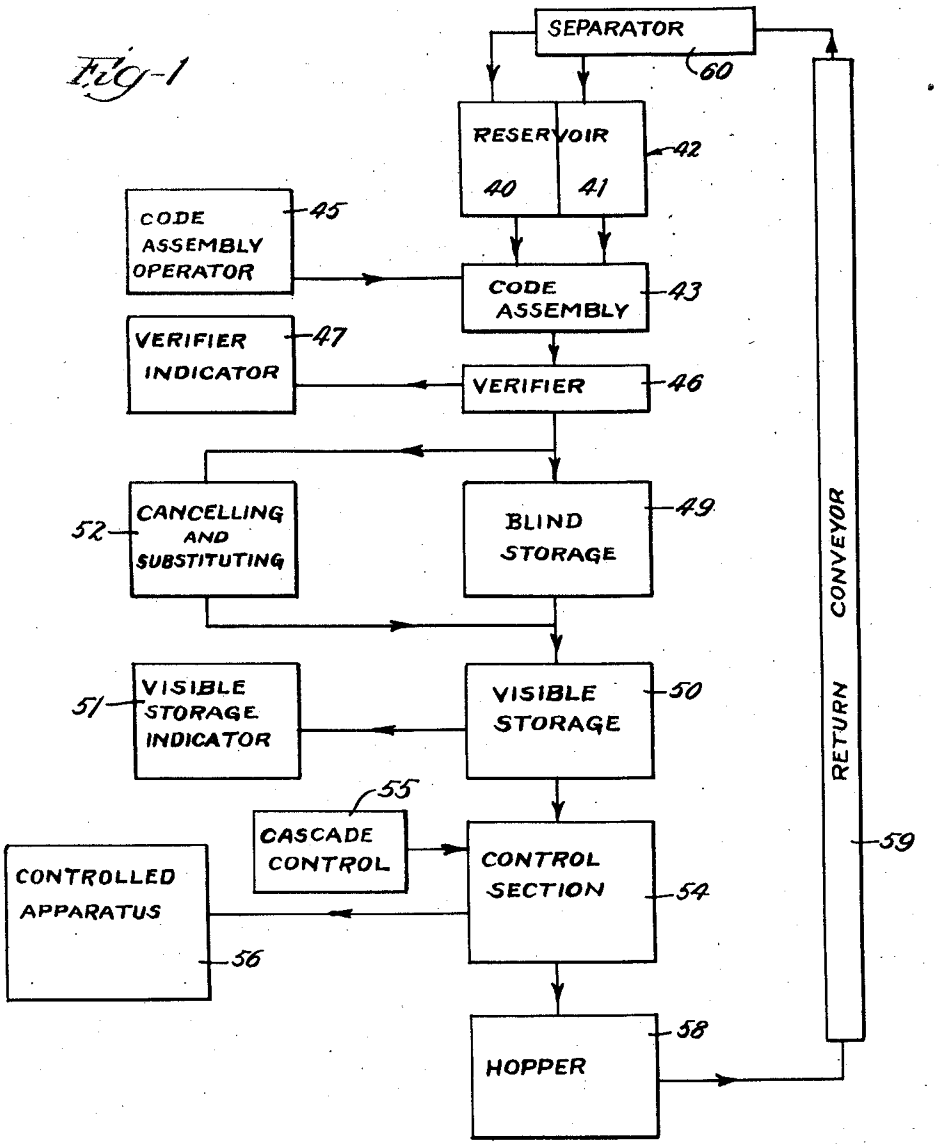

Referring to Fig. 1, which is a block diagram illustrating the general system, there is graphically depicted the sequence of operations that the mechanical elements of the track switch control apparatus must undergo. The mechanical elements are initially deposited in the left and right hand compartments 40 and 41, respectively, of a reservoir 42, elements of one characteristic being placed in compartment 40 and elements of a different characteristic in compartment 41.

From the reservoir 42, the elements are fed into a code assembly section 43 wherein the proper number of elements of appropriate characteristic are selected and arranged in permutational groups to define the routing pattern for the cars to be classified. A code assembly operator 45 is associated with the code assembly section and is adapted to control the selection of the code groups. The operator may be actuated either manually or automatically and may be situated adjacent the remainder of the apparatus or at a remote point as determined by the requirements of the particular application. After assembly, the code groups are passed into a verifier 46 wherein provision is made for checking or verifying the correctness of the assembled code groups and this is displayed by a verifier indicator 47. If the verifier 46 finds that the assembled code group correctly corresponds to the destination selected, then the group of code elements is passed into the next or blind storage section of the apparatus whereas if the assembled code group is found to be incorrect, it is automatically removed from the apparatus and the selection procedure is repeated.

The blind storage section 49 consists of the containers necessary to house and store in their properly selected order the many mechanical elements required to record the classification routing paths of the individual cars of modern freight trains. It has been found that a mechanical storage system permits a large number of train destinations to be stored with little additional expense and theoretically has no maximum limit of storage capacity.

The code elements progress through the blind storage section and emerge at the visible storage section 50 which has associated therewith a visible storage indicator 51 that displays the destinations represented by the code groups contained in the visible storage section. The visible storage section serves as an additional check point for the humpmaster and also furnishes important up-to-date information of the transient status of the classification process. The code groups in the visible storage section correspond to the cars that are immediately approaching the hump and are about to be classified. Such information is important to the humpmaster in supervising the operations of the classification yard. For instance, as has been pointed out hereinbefore, it is frequently necessary to reroute certain of the cars and this is preferably handled as they immediately approach the hump. In addition, it may appear that a plurality of successive cars will follow substantially the same route and due to their different speeds will require retarders to maintain them in spaced relationship. It is helpful to be forewarned so that the retarding operations can be coordinated with the classification operations.

There is illustrated in Fig. 1 a cancelling and substituting section 52 that bypasses the blind storage section 49 and is arranged to facilitate the rerouting of the cars. This section cooperates with the visible storage section 50 in that the visible storage section indicates the necessity of rerouting certain cars and the cancelling and substituting section permits the necessary changes to be carried out. The functions assigned to this section may be divided into three broad categories; namely, (1) cancelling and substituting, (2) cancelling only, and (3) adding a code only. Some of the numerous situations which may give rise to these operations will be discussed more fully hereinafter.

The apparatus of the present invention is coordinated with the classification yard such that a code group passes from the visible storage section 50 to the control section 54 in timed relation with the approach of the car represented thereby to the first or main track switch in the classification yard. The control section may be divided into a series of successive stages that cooperate with the successive levels of the track switches in the physical layout of the yard.

The coordinated advance of the code group from the visible storage section to the control section and subseqeuntly through the various stages of the control section is controlled by a cascade control section 55. At the various stages of the control section 54, the code groups exert their control function to actuate controlled apparatus, as indicated at 56. In the case of a classification yard, the cascade control section 55 comprises a plurality of track detector circuits that respond to the presence of a car on the track section with which they are associated and the controlled apparatus 56 comprises a plurality of track switches.

The first level of track switches consists of the first or main track switch; the second level consists of the immediately successive switch in each of the two alternate routes that lead from the main switch; the third level consists of the immediately successive switch in each of the four alternate routes that lead from the second level of switches; and so on, the number of levels being dependent upon the number of ultimate storage tracks. Thus the first, second, and third stages of the control section 54 cooperate with the first, second, and third levels, respectively, of the controlled apparatus 56.

As a car crosses an approach section for the first track switch, the corresponding code group occupies the first stage of the control section, and, assuming that the previous car has cleared the track detector circuit associated with the first track switch, becomes operative to cause the first switch to be thrown in the prescribed direction. This code group is retained in the first stage until the car actuates the track detector circuit for the first track switch, at which time the code group advances to the second stage of the apparatus. The said track detector circuit maintains the positioning of the track switch until the car clears the switch, at which time subsequent code groups may control the positioning of the first switch. Assuming that the preceding cars have now cleared the track detector circuit associated with the second stage of the apparatus, the code group will immediately throw the proper track switch in the prescribed direction, and this step-by-step process continues until the car reaches its ultimate storage track.

After the code elements have exerted their controlling function, they are subsequently deposited in a hopper or collector 58 that guides them to a return conveyor 59. The return conveyor transports the code elements from the hopper to the reservoir 42. Prior to being deposited in the reservoir, the elments are subjected to the action of a separator 60 which separates them in accordance with their different physical characteristics.

It may be seen that the general system of the present invention is independent of the specific form of elements employed though the preferred form is believed to have many operating advantages over other workable forms. In the preferred form the code elements are freely rolling balls adapted to progress through the system under the force of gravity. Balls of one characteristic are steel, and of the other are glass, and they are distinguished by reason of their different physical characteristics.

It should be understood that other shapes such as cylinders, cubes, oblongs, discs, and the like, may be employed as the mechanical elements and they may be progressed through the system by forces other than gravity such as hydraulic, pneumatic, or magnetic forces. In addition, they may be distinguished from each other by reason of size, weight, conductivity, transparency, or any other suitable criterion, and all of these forms are within the scope of the general system contemplated by the present invention.

GENERAL ORGANIZATION OF THE PREFERRED FORM

Referring now to Fig. 2, there is illustrated a typical classification yard having eight receiving tracks branching out from a single entrance track. Classification yards of this type are analogous to the familiar relay tree circuit patterns and as indicated in Fig. 3 may be represented by such a circuit.

In a yard where each track can always be subdivided into two branch tracks, the number of tracks available with $n$ switching levels is $2^n$. Thus the layout of Fig. 2, which contains four switching levels, theoretically might accommodate sixteen receiving tracks; however, practical considerations of track curvature do not always allow for the successive branching of a particular switching lead. In fact, as shown in Fig. 2, some tracks run directly to the main body of the classification yard from as early as the second switching level.

The receiving tracks, reading from left to right, are designated by reference characters 1 to 8, the directions left and right being determined by standing at the hump or entrance track 100 and facing the receiving tracks. Each of the track switches is labeled SW followed by a pair of numbers designating the receiving tracks spanned by the particular switch. Thus the main switch SW1–8 spans all eight receiving tracks whereas switch SW5–8 spans only receiving tracks 5, 6, 7, and 8. It may be seen that the track layout may be divided into a series of levels as follows: The first or A level comprising switch SW1–8; the second or B level comprising switches SW1–4 and SW5–8; the third or C level comprising switches SW1–3 and SW6–8; and the fourth or D level comprising switches SW1–2 and SW7–8. Thus it may be seen that any desired path may be described by combining four code elements.

In the preferred form, metallic and non-metallic balls are employed as the code elements, steel balls providing one characteristic and glass balls providing the other, and the arrangement is such that a steel ball will cause a track switch to be thrown to the left whereas a glass ball will cause the switch to be thrown to the right. Accordingly, a code system is shown in Fig. 4 which illustrates the various combinations and permutations of steel and glass balls necessary to describe any desired path, the steel balls being represented by a square with an "X" and the glass balls being represented by a blank square. Thus a car to be routed to storage track 2 must pass to the left over switches SW1–8, SW1–4, and SW1–3 (three steel balls), and to the right over SW1–2 (glass ball). Where the number of switches to be traversed is less than the maximum number, the excess code element locations are occupied by glass balls which merely function as spacers.

In the preferred form of the present invention, each code group of balls also includes a steel pilot ball. Its principal functions are to announce the presence of the associated code group at various locations in the apparatus and to assist in coordinating the advance of the code group through the apparatus in timed relationship with the progress of the car in the track layout. This will be more fully described hereinafter.

Figures 5, 6:
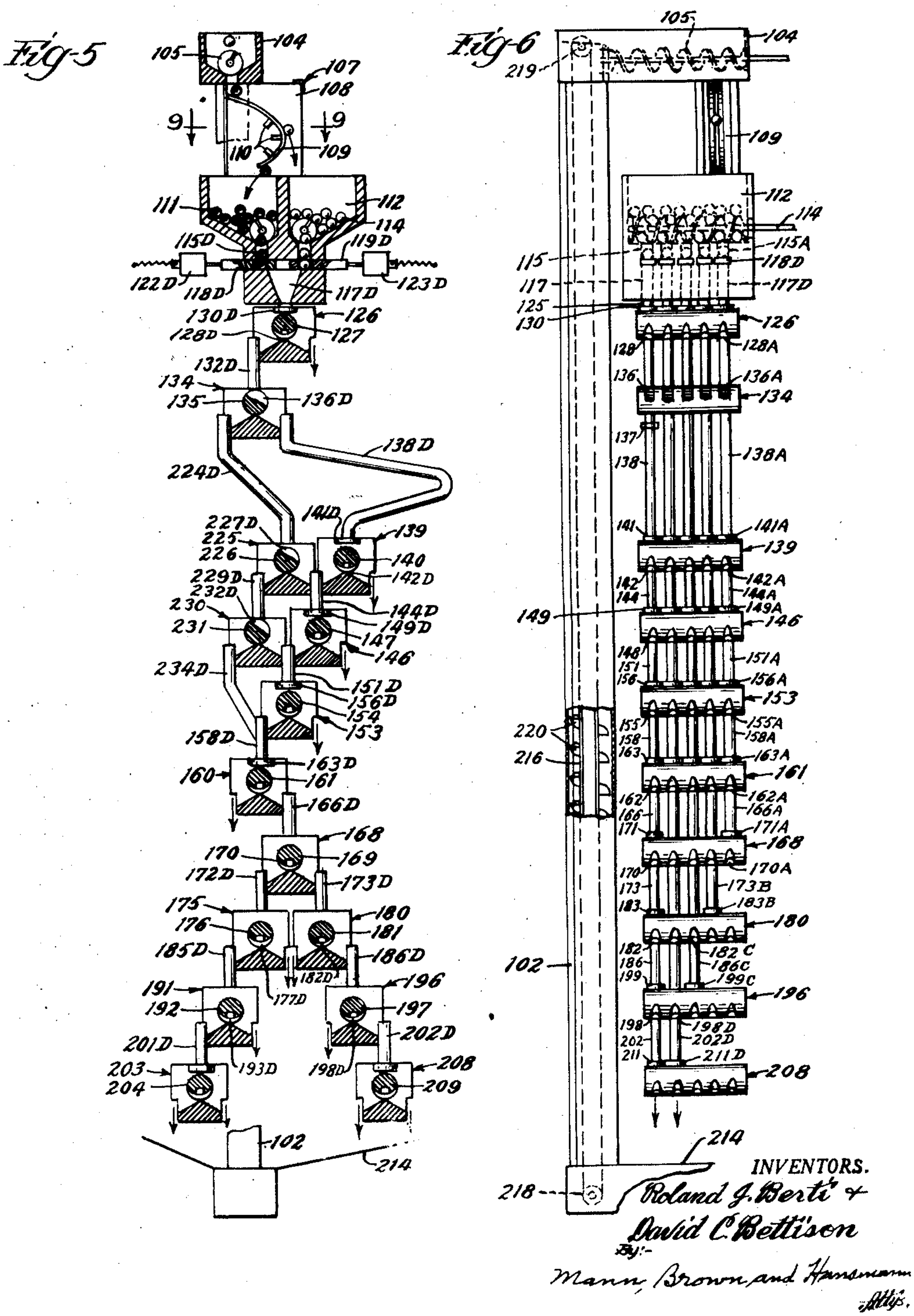
Figs. 5 and 6 are schematic front sectional and side elevational views of the general arrangement of the preferred form of the present invention.

Figs. 5 and 6 are schematic front sectional and side elevational views, respectively, of the preferred form of the invention. In this form successive stages occupy successively lower elevations and the code balls advance through the apparatus under the force of gravity. A power driven return conveyor 102 acts against the force of gravity and elevates the balls from the bottom of the apparatus to the top and the cycle is repeated.

It should be noted that in the preferred form the apparatus is divided into five vertical channels corresponding respectively to the pilot channel, and the fourth, third, second, and first switch levels designated channels D, C, B, and A. Many of the parts in the various channels are identical and for convenient reference the parts of the pilot channel are designated by pure numbers and the corresponding parts in channels A, B, C, and D are designated by identical number with a suffix letter corresponding to the particular channel.

The code elements, as delivered by the return conveyor system 102 to a return hopper 104, consist of a mixture of steel and glass balls. A motor driven worm screw 105 located in the bottom of the return hopper feeds the balls in single file to a permanent magnet type magnetic separator, generally indicated at 107.

Figure 9:
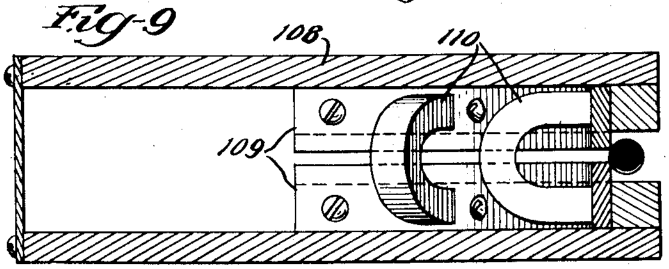
Fig. 9 is a sectional view of the magnetic separator taken in a horizontal plane, as indicated by the line 9—9 of Fig. 5.

The separator, as best seen in the sectional view of Fig. 9, includes a frame having a pair of spaced wooden side panels 108 adapted to support two arcuate strips of silicon steel 109 therebetween. The coplanar silicon steel strips are separated by an air gap having a length of approximately one-half the diameter of the code balls and are magnetized by small permanent horseshoe magnets 110.

When a steel ball is fed to the magnetic separator, it follows the contour of the arcuate strips 109, ultimately dropping into a steel ball reservoir 111. When a glass ball is fed to the magnetic separator, it follows a tangent pattern into a glass ball reservoir 112. Each reservoir is provided with a motor driven worm screw conveyor 114 which progresses the balls past a series of short tubes 115 spaced as shown in Fig. 6. The screw conveyors assure a constant flow of balls to the selector mechanism.

Referring to Fig. 5, which is a sectional elevational view of channel D, it may be seen that the tubes 115D are adapted to feed into individual V-shaped funnels 117D, but the flow of the balls is controlled by the shuttle bars 118D and 119D. A shuttle bar is shown in Fig. 8 and is formed with an aperture 120 adapted to receive one of the code balls. When the shuttle bar is in normal position, the aperture 120 is in register with the bottom end of one of the tubes 115. A ball will drop into the aperture pocket and be supported therein by the horizontal ledges of the funnel 117. As the shuttle bar moves laterally, the aperture will clear the funnel ledges and the ball will pass through the aperture and into the funnel.

The pilot channel, which is always supplied with a steel ball, requires only one shuttle, but each of the code channels is provided with a pair of shuttles. The pairs of shuttle bars are selectively operable so that only one ball is deposited in each funnel at any given instant. With the above exception, all the channels are of identical construction in the reservoir and selector portion of the apparatus.

Figure 22:
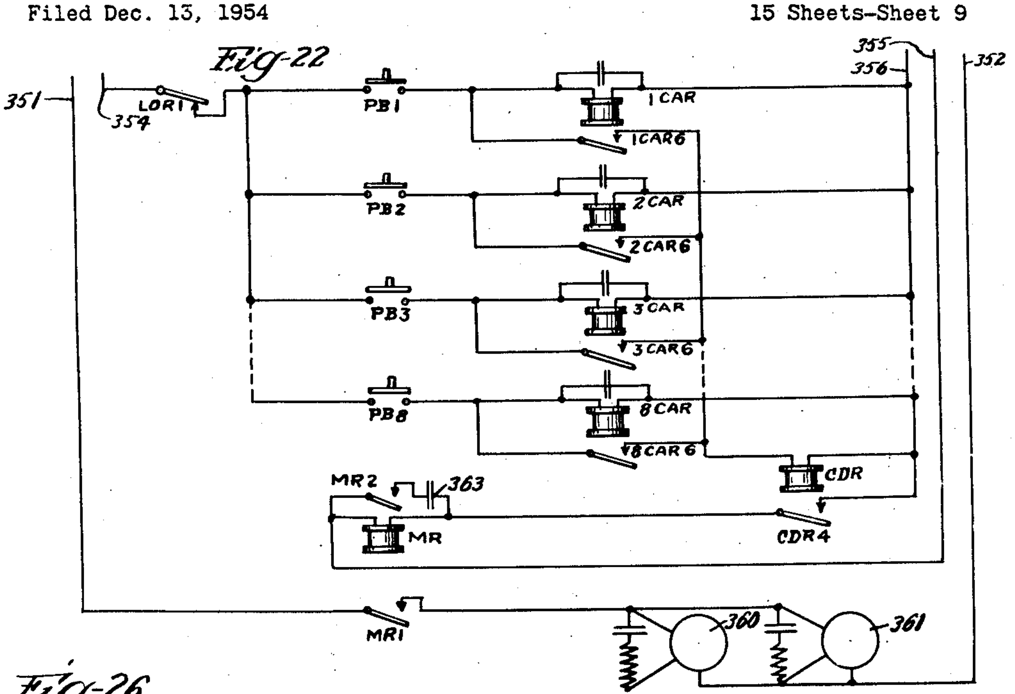
Fig. 22 is a circuit diagram of the push button selector arrangement and reservoir motor control.
Figure 23:
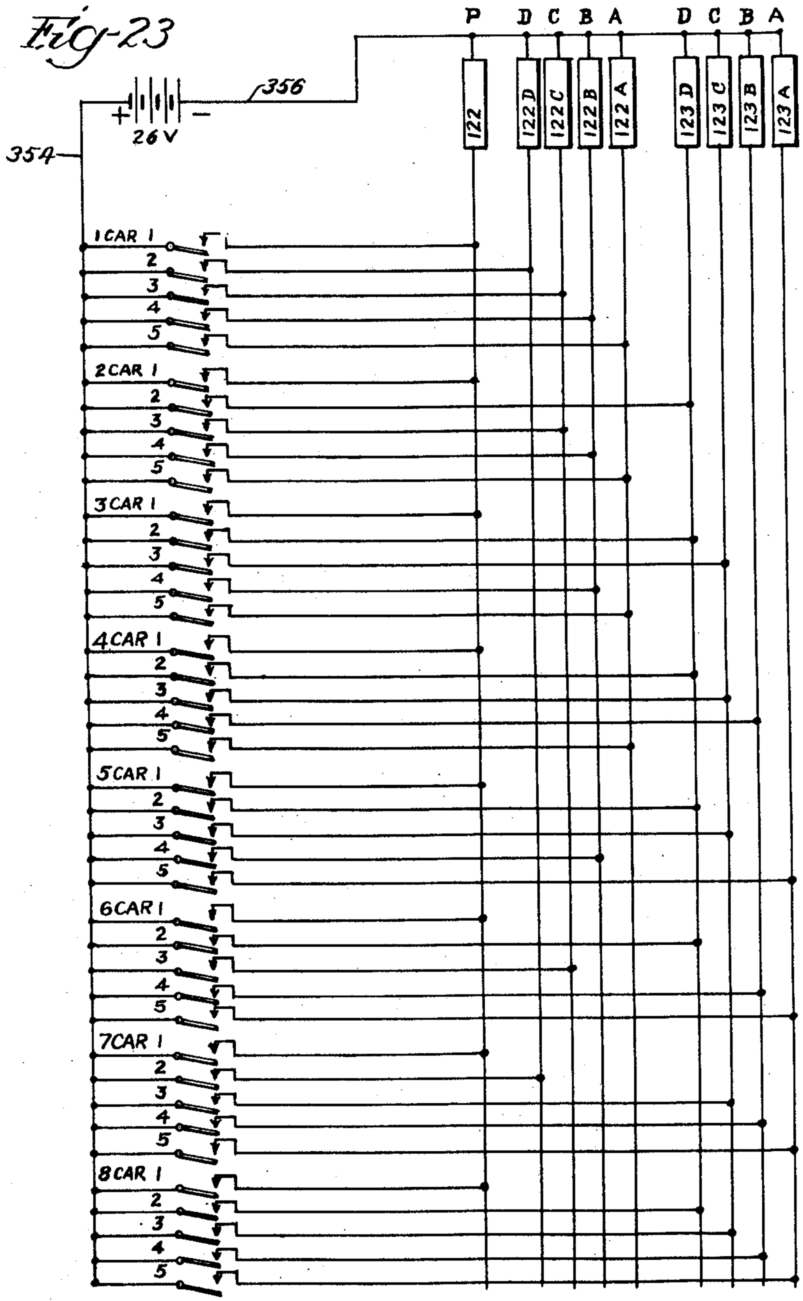
Fig. 23 is a circuit diagram of the solenoid selector arrangement.

The shuttle bars are preferably actuated by solenoids, as indicated at 122D and 123D, and the necessary control circuitry is shown in Figs. 22 and 23. The operation of these circuits will be described hereinafter. For the present it suffices to say that when a car is to be routed to a given storage track, an appropriate button corresponding to that track is actuated and the proper code group is deposited in the V-shaped funnels 117 by the solenoid actuated shuttle bars.

For instance, if it is desired to select a code group representative of receiving track 2, an appropriate button is actuated so that shuttle bars 118, 118A, 118B, 118C, and 118D will operate to deposit a steel ball in each of funnels 117, 117A, 117B, and 117C and a glass ball in funnel 117D.

The funnels 117 each have a hollow depending stem 125 that feeds into a verifier code station 126. The code station 126 includes a code-routing or switching means in the form of a rotatable cylinder 127 that is provided with five axially spaced pockets 128. The cylinder 127 is common to each of the channels and is shown in its normal position with the pockets facing downwardly. With the cylinder so positioned, the group of code balls will remain in the depending stems 125, being in contact with an imperforate surface portion of the cylinder 127.

Figures 24, 25:
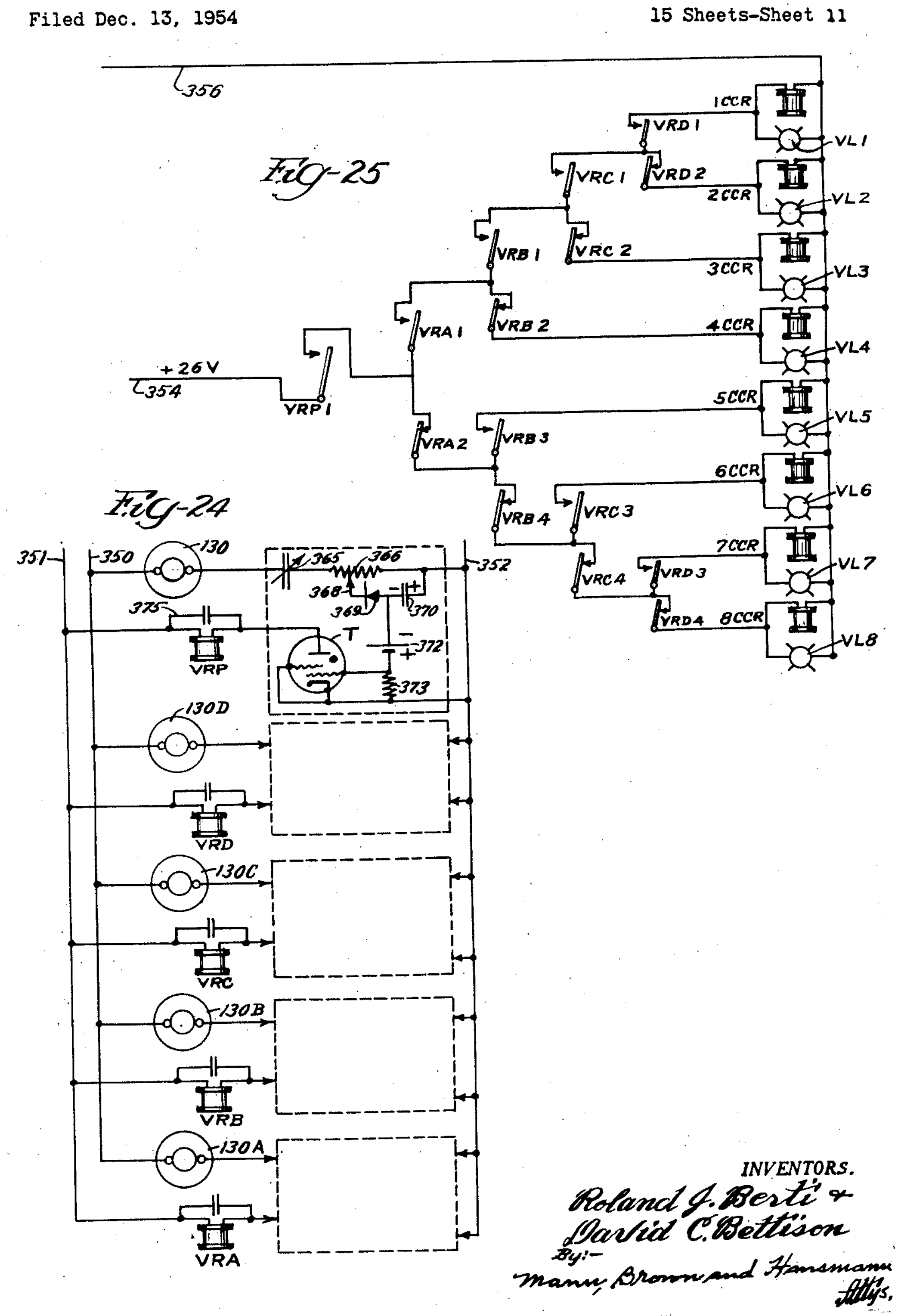
Fig. 24 is a circuit diagram of the detector portion of the verifier circuitry.
Fig. 25 is a relay tree circuit controlled by the circuit of Fig. 24.

Each of the stems 125 is provided with a sensing coil 130 adapted to detect the presence of a steel ball but unresponsive to the presence of a glass ball. The sensing coil forms a portion of an audio frequency resonant circuit that performs the detecting function. This circuit is shown in Fig. 24 and will be fully described hereinafter. For the present it is sufficient to note that each of these detector circuits contains a relay, the contacts of which are arranged in a relay tree circuit, as shown in Fig. 25. The sensing coils, relays, and associated contacts constitute a verifier which checks the accuracy of the selected code groups.

If the verifier indicates that an incorrect code group has been selected, then the cylinder 127 discards the incorrect group. If the verifier indicates that the correct code group has been selected, then the cylinder 127 rotates counterclockwise, as viewed in Fig. 5, to convey the code group to the next stage of the apparatus.

The code groups that are found to be correct by the verifier are deposited in flow passage means in the form of tubes 132 which conduct them to a code transfer station 134. The transfer station includes a rotatable cylinder 135 formed with five axially spaced, semi-cylindrical grooves 136 and is shown in its normal position in Fig. 5 with its grooves directing the code groups from the tubes 132 into the tubes 138.

The tubes 138 constitute the blind storage section of the apparatus and their capacity is theoretically unlimited, but more important, from a practical standpoint a storage capacity in the hundreds or even thousands may be provided at little additional cost. The blind storage tubes 138 are preferably formed into one or more loops to provide maximum capacity within a minimum of space. Successive groups of balls may be selected, verified, and deposited in the blind storage tubes until the entire train being classified has been set up in the apparatus. Thus the present apparatus is capable of recording an entire train in one continuous operation so that the operator may first complete the recording operation and then devote his full and undivided attention to supervising the classification operation and making the necessary reroutings, as previously indicated.

Should the train or trains being classified exceed the storage capacity of the apparatus, provision is made for notifying the operator and automatically de-energizing the code selecting mechanism. For this purpose the pilot channel blind storage tube 138 is provided with a sensing coil 137. This coil actuates the circuits of Figs. 29 and 30, as will be explained hereinafter.

The blind storage tubes 138 also constitute flow passage means that feed into a code station 139 within which is mounted a rotatable cylinder 140. The code station 139 is generally similar to the verifier code station 126 having a sensing coil 141 associated with each of the tubes 138 and having the cylinder 140 formed with five axially spaced pockets 142 which face downwardly when the cylinder is in normal position.

As the first code group reaches the bottom end of the tubes of the blind storage section, the balls encounter an imperforate surface portion of the cylinder 140. The arrangement is such that when a code ball is supported by the cylinder 140, it will be in the field of one of the sensing coils 141.

The code station 139 constitutes the top level of the visible storage section, and in the preferred form of the apparatus there are provided four such levels arranged in series relationship. The top level for convenience is termed the fourth level and it is connected to the third level by flow passage means in the form of tubes 144. The third level is identical with the fourth and comprises a code station 146 having a rotatable cylinder 147 provided with the usual pockets 148. Each of the tubes 144 is provided with a sensing coil 149. The third level is connected with the second level by the tubes 151 and the second level comprises an identical code station 153 having a rotatable cylinder 154 with the usual pockets 155. Each of the tubes 151 is provided with a sensing coil 156. Finally, the second level is connected to the first level by the tubes 158 and the first level comprises an identical code station 160 having a rotatable cylinder 161 with five axially spaced pockets 162. A sensing coil 163 is provided for each of the tubes 158.

The cascading of the code groups through the successive levels of the visible storage section is controlled by the pilot channel which always has a steel ball. When a code group arrives at the code station 139, the sensing coil 141 of the pilot channel detects the presence of a steel ball, and if there is no code group at the next lower level, a motor control circuit will become operative to energize a motor (not shown) and drive the cylinder 140 counterclockwise, as viewed in Fig. 5. The pockets 142 will sweep past the tubes 138, receive the first code group, deposit it in the tubes 144, and complete the cycle of rotation. The code group thus cascades down to the third level where the procedure will be repeated. This process continues until there is one code group at each level of the visible storage section.

Figure 7:
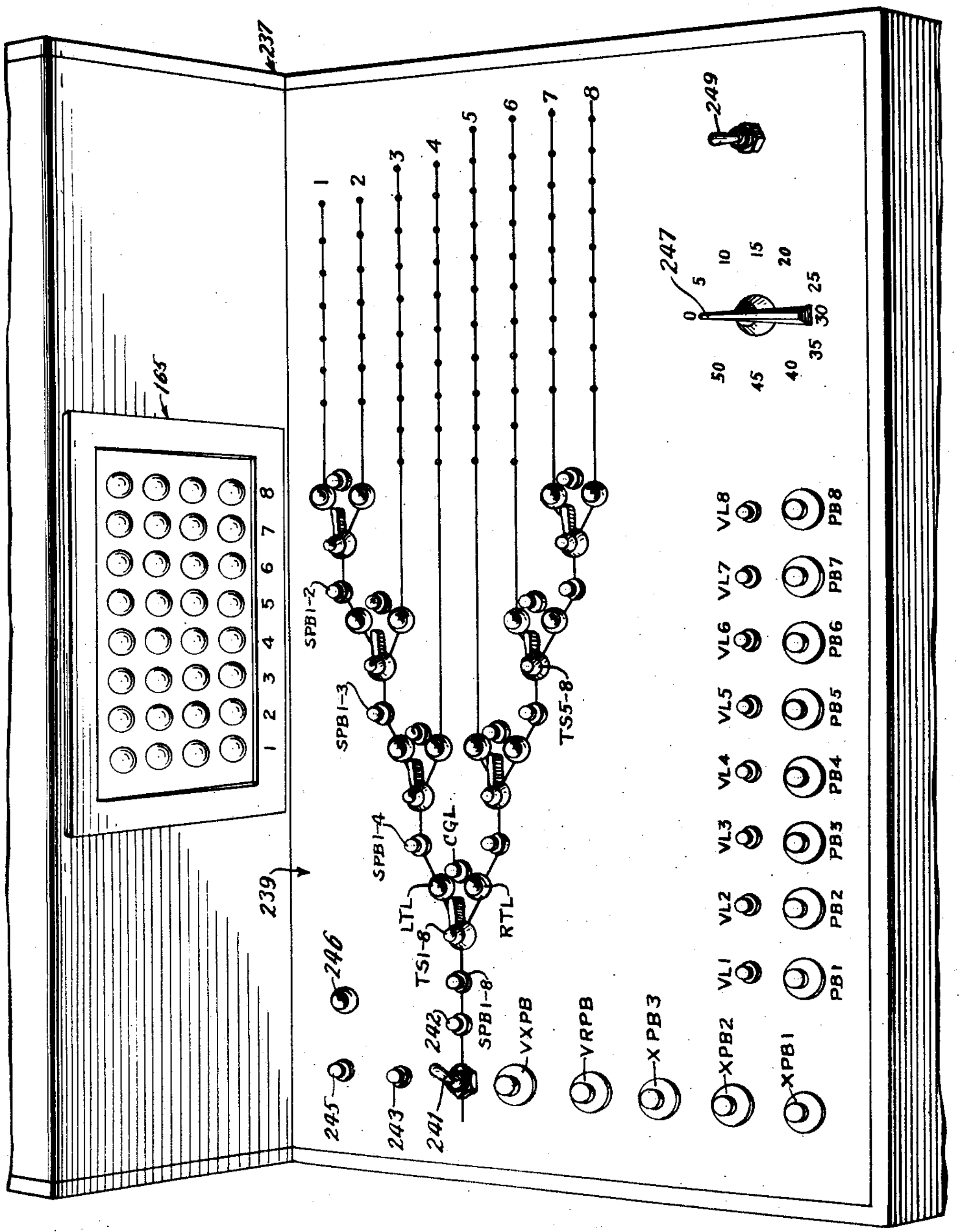
Fig. 7 is a view of the console control box employed by the operator to control the various classification operations.

The visible storage section controls an indicator panel that is mounted on the console of Fig. 7, as indicated generally at 165. The indicator panel consists of four horizontal rows of lights, there being eight lights in each row corresponding to the eight receiving tracks. The lights of each row of the indicator panel are arranged in relay tree circuits of the type shown in Fig. 3, and these circuits are controlled by the sensing coils at each level of the visible storage section, whereby the receiving track represented by the code group at each level of the visible storage section is displayed on the indicator panel.

The apparatus will remain in the set-up condition until the cars of the train, in approaching the hump 100, pass over an approach section of track, indicated at 101 in Fig. 2, and actuate an associated track detector circuit. This track circuit controls a relay, one of the contacts of which is in the motor control circuit for the cylinder 161 located in the first level of the visible storage section. When a car passes over the approach section 101, the cylinder 161 rotates clockwise, sweeping past the tubes 158 to receive the first code group and convey it to the tubes 166. Thus, the first car, in passing the approach section for the main track switch SW1–8, causes the associated descriptive code group to cascade from the first level of the visible storage section to the control section of the apparatus.

The control section of the apparatus is, in a sense, a mechanical analogue of the classification yard track layout. Corresponding to the track switches are the mechanical code stations, and corresponding to the branch sections of track are the flow passage means in the form of tubes that interconnect the mechanical code stations. The tubes 166 correspond to the entrance track 100 and feed into a code station 168 that corresponds to main track switch SW1–8. The code station 168 includes a rotatable cylinder 169 having the usual pockets 170 and adapted to rotate in either direction to convey the code groups either to the tubes 172 or to the tubes 173. The tubes 172 conduct the code groups to code station 175 and the tubes 173 conduct the code groups to code station 180. Thus code stations 175 and 180 form the second level of the control section and correspond to track switches SW5–8 and SW1–4, respectively. Code station 175 includes a rotatable cylinder 176 having the usual pockets 177 and is adapted to rotate in either direction. Similarly, code station 180 includes a rotatable cylinder 181 having the usual pockets 182 and is adapted to rotate in either direction. The cylinder 176 conveys the code groups either to the tubes 185 or to a collecting hopper 214, and this corresponds to receiving track 5. The cylinder 181 conveys the code groups either to the tubes 186 or to the collecting hopper and this corresponds to receiving track 4.

The tubes 185 and 186 feed the code groups into code stations 191 and 196, respectively, and these stations constitute the third level of the control section and correspond to track switches SW6–8 and SW1–3, respectively. The rotatable cylinder 192 having pockets 193 is adapted to convey the code groups either to the tubes 201 or to the collecting hopper and the rotatable cylinder 197 having pockets 198 is adapted to convey the code groups either to the tubes 202 or to the collecting hopper.

The tubes 201 and 202 feed the code groups into code stations 203 and 208, respectively. These stations constitute the fourth level of the control section and correspond to track switches SW7–8 and SW1–2, respectively. The rotatable cylinders 204 and 209 rotate in either direction to convey the code groups to the collecting hopper 214.

The arrangement of the control section is such that the code station 168 which corresponds to the first or A switch level is controlled by the code ball in channel A. Similarly, code stations 175 and 180 are controlled by the code ball in channel B; code stations 191 and 196 are controlled by the code ball in channel C; and code stations 203 and 208 are controlled by the code ball in channel D. Therefore, each code station of the control section is provided with only two sensing coils, one for the pilot channel and one for the operative code channel.

Hence, code station 168 has a sensing coil 171 mounted on pilot channel tube 166 and a sensing coil 171A mounted on tube 166A; code station 180 has a sensing coil 183 mounted on pilot channel tube 173 and a sensing coil 183B on tube 173B; code station 196 has a sensing coil 199 on pilot channel tube 186 and a sensing coil 199C on tube 186C; and code station 208 has a sensing coil 211 on pilot channel tube 202 and a sensing coil 211D on tube 202D. Code station 175, 191, and 203 are arranged identically with their corresponding stations 180, 196, and 208, respectively.

It should be noted that the tube sets 172 and 173 have only four tubes per set, the channel A tube being omitted in each case. As described previously, the channel A code ball exerts its controlling function in code station 168 and it becomes irrelevant whether it is carried through the apparatus with the remainder of its code group or is immediately discarded into the collecting hopper 214. Similarly, the tube sets 185 and 186 may omit both the channel A and channel B tubes and the tube sets 201 and 202 may omit channel A, B, and C tubes.

The collecting hopper 214 is suitably inclined to collect the discarded code groups and deliver them to the return conveyor 102. The return conveyor consists of an endless chain 216 mounted upon spaced coplanar sprockets 218 and 219, sprocket 218 being mounted adjacent the collecting hopper and sprocket 219 being mounted at the top end of the apparatus. The endless chain 216 is provided with a series of conveyor cups 220 that receive the code balls and transport them to the top of the apparatus. Preferably the lower sprocket 218 is connected with a motor, not shown, to provide the necessary power for the return conveyor. At the top of the apparatus, the conveyor cups 220 deposit the code balls in the return hopper 104 and complete the cycle.

With the exception of the sensing coil arrangement, the code stations of the control section are identical mechanically with those of the visible storage section, and this uniformity in the basic components results in a more economical apparatus that may be maintained with but a minimum of spare parts. It should be noted that each of the code stations are provided with individual motors (not shown) and their control circuits are described hereinafter.

Returning now to the instant when a car passes the approach section 101 and causes the associated descriptive code group to cascade from the first level of the visible storage section to the control section of the apparatus, it will be assumed for the purposes of explanation that the car is destined for receiving track 2. Thus, tubes 166, 166A, 166B, and 166C each receive a steel ball and tube 166D receives a glass ball. As previously explained, the subsequent code groups immediately cascade to again fill the visible storage section and these new positions are maintained until the next car to be classified passes the approach section.

The first code group falls by gravity to the bottom of the tubes 166 wherein the balls contact and are supported by the surface of the rotatable cylinder 169. When thus supported, the pilot channel ball is surrounded by sensing coil 171 and the A channel ball is surrounded by sensing coil 171A. The code ball within sensing coil 171A, being a steel ball, causes track switch SW1–8 to assume a left-hand position and direct the first car to the left, as viewed from the hump 100. As the first car arrives at the main track switch SW1–8, it actuates a track detector circuit associated therewith and thereby energizes a motor control circuit for cylinder 169. The steel code ball in channel A causes cylinder 169 to rotate clockwise, as viewed in Fig. 5, and convey the remainder of the code group from the tubes 166 to the tubes 173, the channel A code ball being discarded into the collecting hopper.

The remainder of the code group falls by gravity to the bottom of the tubes 173 wherein the balls contact and are supported by the surface of the rotatable cylinder 181. At this station the pilot channel ball is surrounded by sensing coil 183 and the B channel ball is surrounded by sensing coil 183B. The code ball within sensing coil 183B, being a steel ball, causes track switch SW1–4 to assume its left-hand position. When the first car arrives at track switch SW1–4, it actuates the associated track detector circuit thereby energizing a motor control circuit for cylinder 181. The steel code ball in channel B causes cylinder 181 to rotate clockwise, as viewed in Fig. 5, and convey the remainder of the code group from the tubes 173 to the tubes 186, the channel B code ball being discarded into the collecting hopper.

When the code group arrives at the C level of the control section, the steel code ball in channel C is surrounded by sensing coil 199C and causes track switch SW1–3 to assume its left-hand position. As the car arrives at track switch SW1–3 and the motor control circuit for cylinder 197 is energized, the steel ball in channel C causes cylinder 197 to be rotated clockwise, as viewed in Fig. 5, thus delivering the code group from the tubes 186 to the tubes 202.

Finally, when the code group arrives at code station 208, the glass code ball in channel D throws track switch SW1–2 to its right-hand position to direct the car to receiving track 2. When the car arrives at switch SW1–2 and energizes the track detector circuit, the glass code ball causes cylinder 209 to rotate counterclockwise, as viewed in Fig. 5. Since cylinder 209 discards the remains of the code group into the collecting hopper, it need not have bi-directional control, but for purposes of illustration, bi-directional control for cylinder 209 was assumed.

The cancelling and substituting function, according to the preferred form, is carried out by three code transfer stations 134, 225, and 230. These transfer stations permit cancellations and substitutions in the first, second, and third levels of the visible storage section. There is no provision for cancelling and/or substituting code groups in the fourth level of the visible storage section as this would require an additional transfer station, and due to physical space limitations in the mounting frame, this is not deemed practical.

The ability of the present apparatus to perform any necessary cancelling and substituting functions is one of the most important features of the present invention and the present apparatus is especially valuable because the cancelling and substituting operations may be performed without interrupting the classification procedure and without interfering with the code groups stored above the particular group being cancelled.

All of the transfer stations are identical in construction and transfer stations 225 and 230 include rotatable cylinders 226 and 231, respectively. Cylinder 226 is formed with semi-cylindrical notches 227 and cylinder 231 is formed with similar notches 232. In Fig. 5 the transfer cylinders are shown in their normal position and all of the code groups that are passed by the verifier are directed into the blind storage tubes 138. The transfer cylinders are adapted to be rotated counterclockwise, as viewed in Fig. 5, to oppositely incline the base portions of the notches, and this is known as their substituting position.

Transfer station 134 is fed by the tubes 132 that depend from the verifier unit 126 and it routes the code groups that have been checked by the verifier either to the blind storage section or to the cancelling and substituting section of the apparatus. Accordingly, transfer station 134 is provided with alternative outlet paths, one leading to the blind storage tubes 138 and the other leading to the tubes 224 which feed transfer station 225. The transfer station 225 is also provided with alternative outlet paths, one leading to the tubes 144 which supply the code station 146 of the third level of the visible storage section and the other leading to the tubes 229 which feed transfer station 230. Finally, transfer station 230 is provided with alternative outlet paths, one leading to the tubes 151 that supply the second level of the visible storage section and the other leading to the tubes 234 that communicate with the tubes 158 which supply the first level of the visible storage section.

For purposes of explanation, it will be assumed that there is one code group in each level of the visible storage section and that it is desired to cancel the code group in the third level and substitute a new group therefor. The necessity of such an operation may arise in any number of ways. Inspection may have revealed that the car is in need of repair, and, therefore, it must be rerouted from its original storage track or it may be that the particular car was originally routed improperly due to human error.

A cancelling push button XPB3, located on the console of Fig. 7, is first depressed to cause the cylinder 147 of the third level of the visible storage section to rotate clockwise and dump the undesired code group directly into the hopper. Simultaneously, cylinder 135 rotates counterclockwise approximately 100 degrees to set up a path from the verifier through transfer station 134, tubes 224, and transfer station 225 to the tubes 144 which supply the sensing cylinder 147. The code group to be substituted is then selected, passed into the verifier for checking, and guided through transfer station 134, which is in its substituting position, and transfer station 225, which is still in its normal position. At this time the cancelling push button is released and transfer cylinder 135 returns to its normal position. It should be noted that the tendency for the code group at the fourth level to cascade when the original group occupying the third level is dumped is prevented by suitable circuit means. This will be explained more fully hereinafter.

Assuming now that the code group to be cancelled were in the second level, the appropriate cancelling push button is depressed to cause the cylinder 154 of the second level of the visible storage section to rotate clockwise, receive the second level code group within its pockets, and dump them into the hopper 214. Simultaneously, both transfer cylinder 135 and transfer cylinder 226 rotate counterclockwise approximately 100 degrees to their substituting position, and there is a path for the code group to be selected extending from the verifier through transfer station 134, which is in its substituting position, transfer station 225, which is also in its substituting position, and transfer cylinder 230, which is in its normal position. The remainder of the procedure is identical with that described in the case of cancelling and substituting a code group at the third level.

Finally, if it is desired to cancel and substitute in the first level of the visible storage section, the appropriate push button is actuated to cause the cylinder 161 of the first level to rotate counterclockwise and dump the undesired code group. Simultaneously, transfer cylinders 135, 226, and 231 rotate counterclockwise to their substituting positions and establish a path from the verifier unit through each of transfer stations 134, 225, and 230, all of which are in their substituting positions, to the tubes 158 supplying the cylinder 161 of the first level of the visible storage section.

In some instances it is desired only to cancel a certain code group without substituting anything in its place. Because of the compact nature of the circuitry of the present device, this procedure is carried out in exactly the same manner as that described for the combined cancelling and substituting operation with the exception, of course, that no new code group is selected and guided into the vacated cylinder. Instead, as soon as the cylinder has dumped the undesired code group, the cancelling push button is immediately relieved and the transfer cylinders which had operated simultaneously with the code station cylinder return to normal. Upon relieving the cancelling push button, the next successive code groups cascade one position to fill up the vacated section of the apparatus.

Another similar type of operation which is possible with the present apparatus is one in which it is merely desired to insert one or more code groups between certain of the existing code groups. For instance, if it were desired to insert a code between the code groups in the second and third levels of the visible storage section, this is accomplished by first cancelling the group in the second level and then substituting, first, the original group and, second, the group to be inserted. This could also be accomplished by cancelling the third group and inserting, first, the group to be inserted and, second, the original third group. The reason for this procedure resides in the fact that the control circuitry for the transfer cylinders which permit the substitutions is intimately related with the control circuitry for the code station cylinders which effectuate the cancelling. In other words, it is not possible to rotate one of the transfer cylinders without also rotating one of the code station cylinders. It is, of course, within the scope of the present invention to provide the necessary circuitry to permit these operations to be carried out independently.

A console, generally indicated at 237 in Fig. 7, is adapted to be used with the apparatus of Figs. 5 and 6. The console includes not only the display panel 165, previously referred to in connection with the visible storage section, but also control apparatus for the electrical circuitry. The console is provided with a row of push buttons designated PB1 to PB8 that correspond to receiving tracks 1 to 8, respectively. There is an indicating light opposite each of the push buttons and these lights are designated VL1 to VL8.

The push buttons PB1 to PB8 control the code selection apparatus and the indicating lights are controlled by the selected code group and serve as a visual check point for the operator. For instance, if the operator wishes to route a car to receiving track 5, push button PB5 is depressed and the selecting mechanism forms a code group. This code group passes to the verifier and energizes a relay tree circuit, shown in Fig. 25, which includes the verifier indicator lights VL1 to VL8. If, for some reason, a code group corresponding to track 3 was formed by the selecting mechanism, then VL3 lights up and the operator is warned of the error.

In the lower left-hand corner of the console 237, another row of five push buttons is provided, designated from top to bottom VXPB, VRPB, XPB3, XPB2, and XPB1. The push buttons VXPB and VRPB are used in conjunction with the verifier circuitry of Fig. 26 and are discussed in connection therewith. Push buttons XPB1, 2, and 3 are used in connection with the cancelling and substituting operations previously described and they are associated with the first, second, and third visible storage levels, respectively. The circuitry which they control is shown in Figs. 27A and B.

The console is also provided with a miniature track layout, generally indicated at 239, to simulate the layout of the classification yard. For each switch point, the console layout 239 includes a push button SPB which, when depressed, simulates the passage of a car over a track detector circuit, a three position switch TS adapted to control the positioning of the track switch and thereby override the controlling function of the code group, an indicator light CGL to indicate the presence of a code group at a station of the control section of the apparatus, and a pair of indicator lights LTL and RTL to indicate the actual position of the track switch. All of these devices are discussed in connection with the control section circuitry of Fig. 31.

At the head end of the console layout there is a storage switch 241 which, when open, prevents the track circuit associated with the approach section 101 from initiating the cascading of the code groups in the visible storage section. The switch 241 is included in order to insure that code groups already stored in the apparatus are not prematurely released by the passage of a switch engine over the approach section 101. It frequently happens that the trimmer or switch engine must reroute certain of the cars already stored in the classification yard, and in so doing it is sometimes necessary for the switch engine to pass back and forth over the approach section.

Figure 27B:
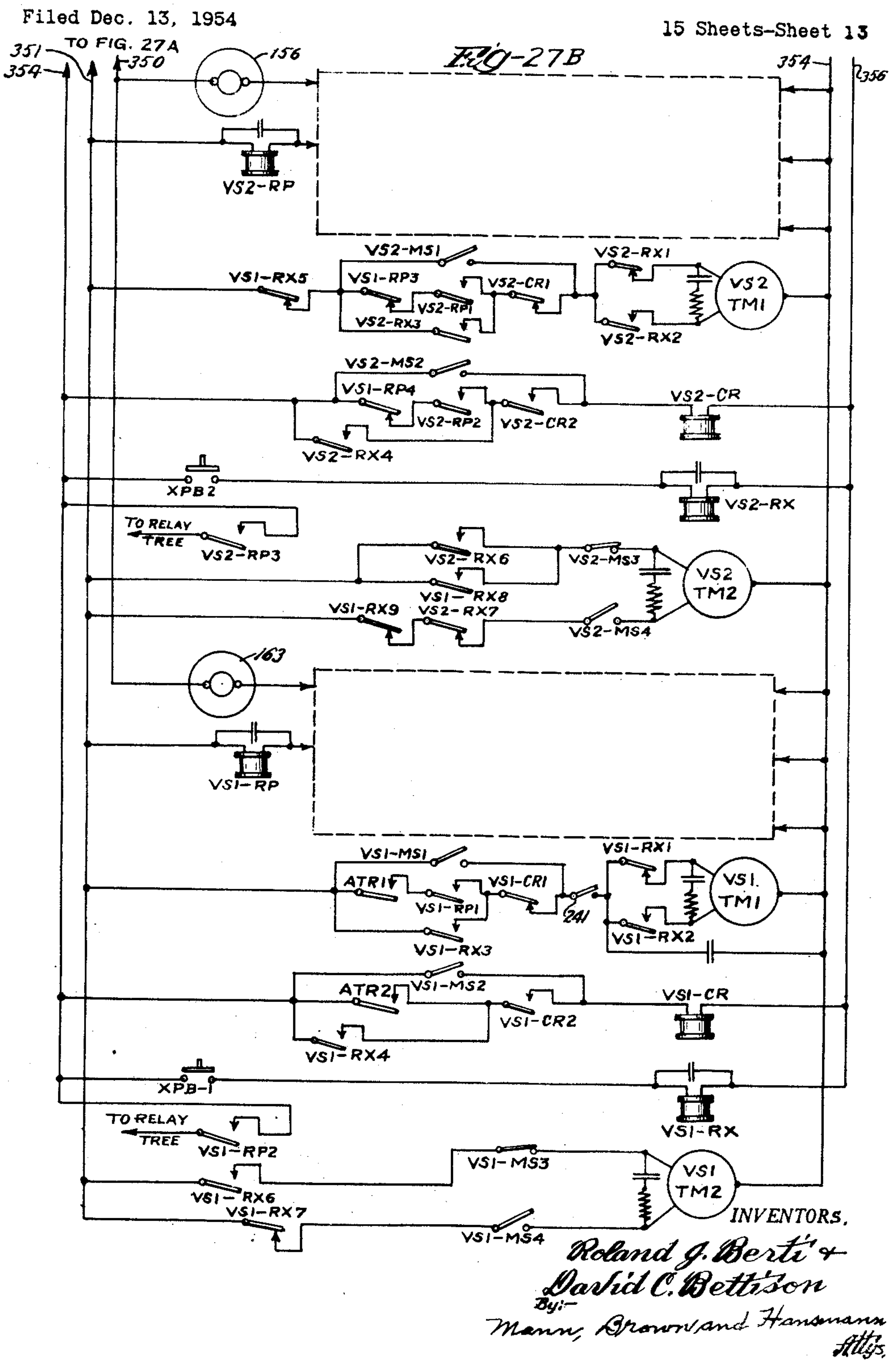

Also at the head end of the layout there is provided a push button 242, its function being to simulate the passage of a car over the approach section 101. The contacts ATR1 and ATR2, shown in Fig. 27B, are controlled by a relay ATR (not shown). Relay ATR is adapted to be energized by a track circuit associated with the approach section and also by depressing push button 242. The push button 242 cooperates with the SPB push buttons in facilitating the testing of the apparatus. For instance, with a code group for track 2 residing in code station 160, by successively depressing push buttons 242, SPB1–8, SPB1–4, SPB1–3, and SPB1–2, it is possible to simulate the passage of a car from the hump to receiving track 2. A push button 243 is also shown on the console and it is adapted to control cylinder 140 of the fourth level of the visible storage section. When push button 243 is depressed, the cylinder 140 continuously rotates clockwise, as viewed in Fig. 5, and one-by-one dumps all of the code groups stored in the blind storage section. The switch 241, contacts ATR1 and ATR2, and push button 243 are connected into the circuits of the visible storage section, as shown in Figs. 27A and B.

As previously described, a sensing coil 137 is positioned on the pilot channel blind storage tube, as shown in Fig. 6, and is operative to indicate that the capacity of the blind storage section has been reached. The associated control circuitry for sensing coil 137 is shown in Figs. 29 and 30 and includes a push button 245 and indicating light 246. The latter are mounted on the console. Finally, a reminder switch 247 is mounted on the console and it cooperates with the circuitry of Fig. 28 to facilitate the identification of certain code groups that are stored in the blind storage section. This is explained in greater detail in connection with Fig. 28. The toggle switch 249, shown in the lower right-hand corner of the console, is operative to connect and disconnect the entire apparatus of the present invention from the track circuits and track switches.

MECHANICAL COMPONENTS OF THE APPARATUS OF THE INVENTION

The apparatus of Figs. 5 and 6 is particularly advantageous because it employs substantially identical mechanical components. As mentioned previously, the sensing units employed in the verifier section, visible storage section, and control section are basically identical and may be interchanged with but a minimum of modification. The transfer units are not only identical among themselves, but to a large extent they are similar to the sensing units. These factors permit the employment of mass production techniques and greatly reduce the cost of the apparatus. In addition, they simplify the problem of spare parts.

*Code stations*

Figure 10:
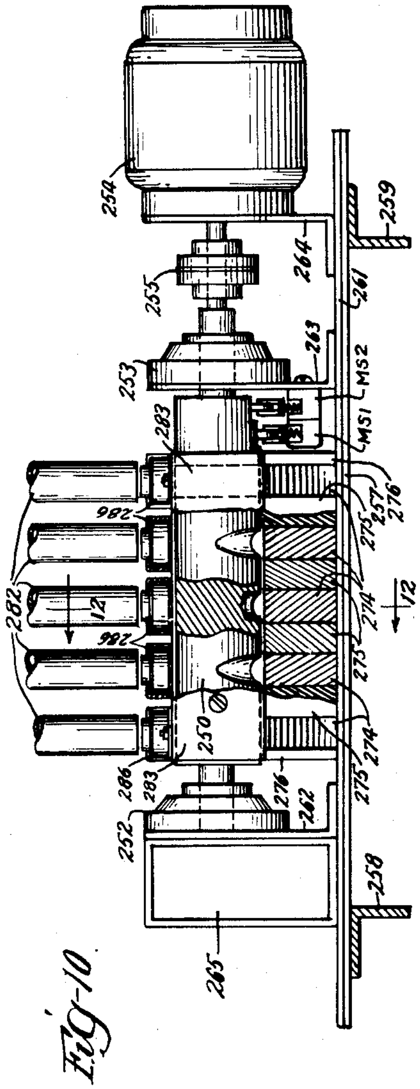
Fig. 10 is a side view partly in section of a code-routing station of the present invention.

A typical code station is shown in Fig. 10 and includes a metallic cylinder 250 journalled in suitable bearings 252 and 253 and operatively coupled, as at 255, to a torque motor 254. The code station is shown mounted on a pair of angle iron frame members 256 and 257 (see Fig. 12), the members 256 and 257 constituting a portion of a main mounting frame and being themselves secured to angle iron cross members 258 and 259.

The code station includes a bottom channel member 261 that serves as a tray and is adapted to be slidably received within the mounting pocket formed by the angle iron members 256 and 257. Throughout the structure, the main mounting frame is provided with similar mounting pockets to permit the code stations to be interchanged simply by sliding out the old tray and sliding in the new one. At one end an L-shaped bracket 262 is secured to the tray 261 and supports the bearing 252. At the opposite end a similar L-shaped bracket 263 is secured to the tray 261 and supports the bearing 253. The motor 254 also is mounted by means of an L-shaped bracket 264. An electrical terminal box 265 is secured to the bracket 262 to provide a convenient external connection for the code station's control wires (not shown).

Figures 11, 19:
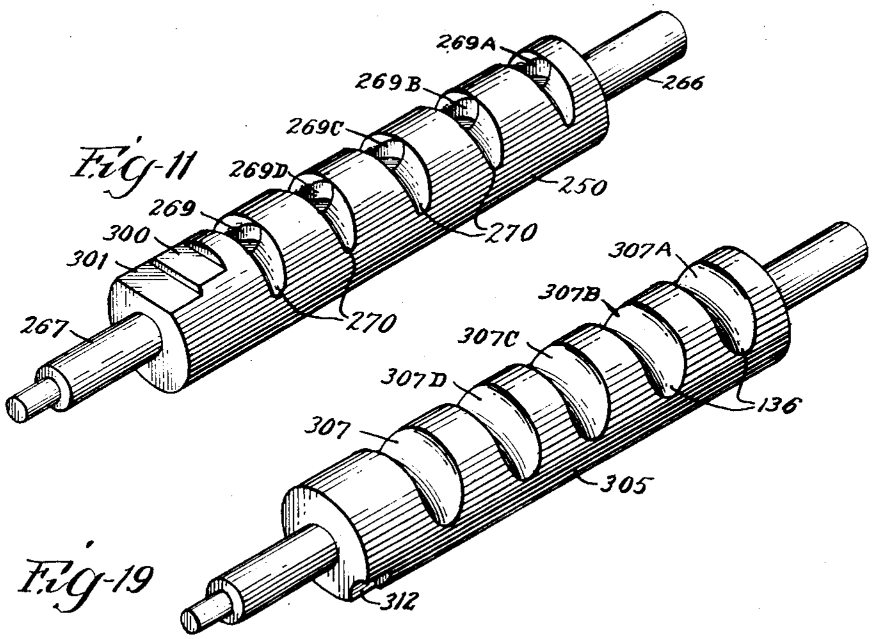
Fig. 11 is a perspective view of a code-handling cylinder.
Fig. 19 is a perspective view of a code transfer cylinder.
Figure 12:
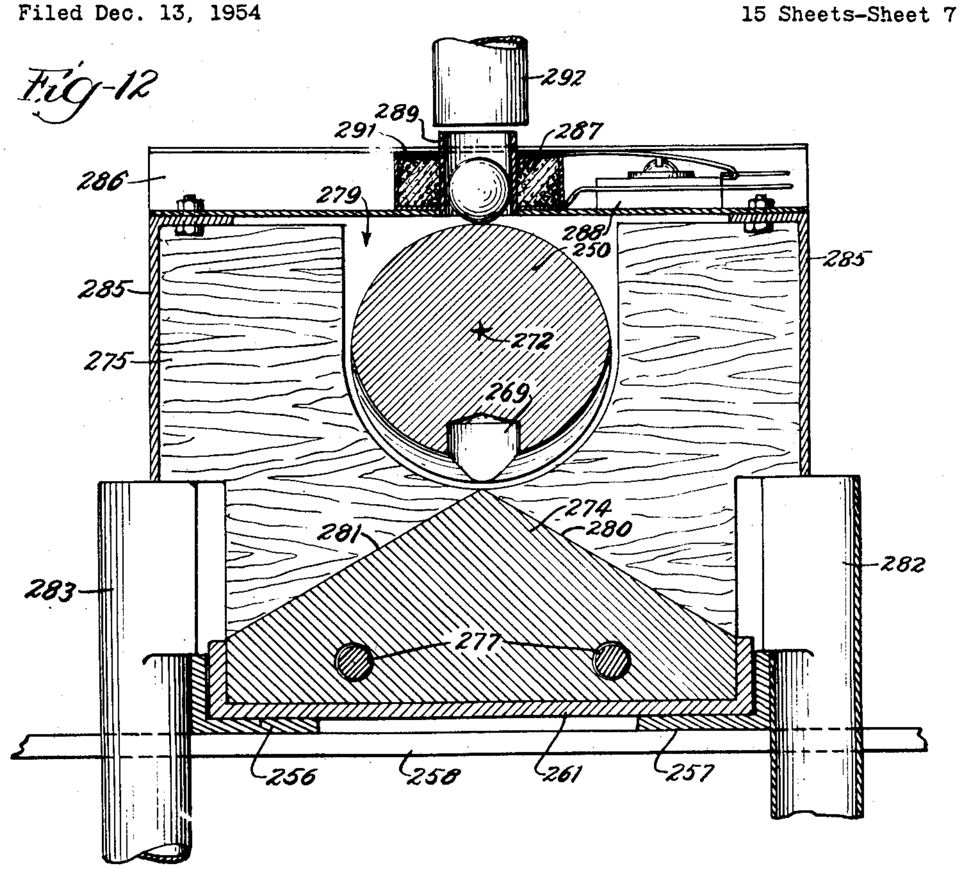
Fig. 12 is a sectional view of the code-routing station taken in a vertical plane, as indicated by the line 12—12 of Fig. 10.

The cylinder 250 is shown in Fig. 11. The shaft end 266 is supported in the bearing 252 and shaft end 267 is supported in the bearing 253. The cylinder 250 is provided with five aligned, axially spaced pockets corresponding to the pilot channel and the four code channels of Fig. 5, the pockets being numbered 269, 269D, 269C, etc. The pockets 269 are formed centrally in the arcuate grooves 270 and are sufficiently large to receive the code balls. As shown in Fig. 12, the center of curvature 272 for the arcuate grooves is offset from the center of the circular cross section of the cylinder 250, and the arrangement is such that the groove depth is a maximum immediately adjacent the pockets 269.

Figure 13:
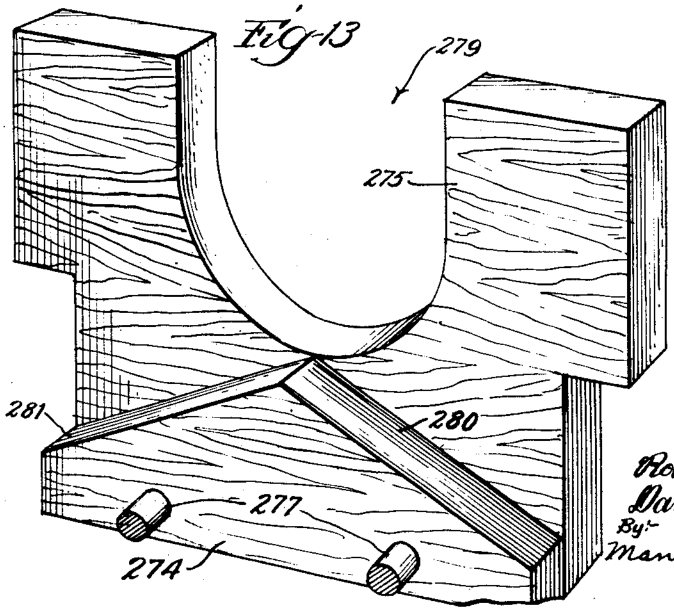
Fig. 13 is a perspective view of one of the guide chambers of the code-routing station.
Figure 14:
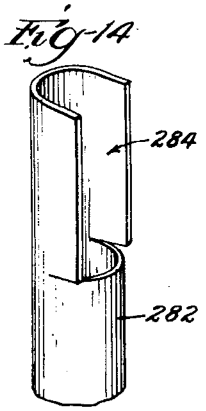
Fig. 14 is a perspective view of one of the exit tubes of the code-routing station.

The code station is provided with five internal chambers corresponding to the five pockets of the cylinder and each of these chambers has a pair of outlets. The chambers are formed by a series of spacers 274 disposed between each of the intermediate panels 275 and end panels 276. The entire assembly may be secured together by means of a nut and bolt arrangement and fixed to the mounting tray 261, the shanks 277 of the bolts being shown in Figs. 12 and 13. The panels 275 and 276 are each provided with a U-shaped recess 279, the bottom portion of which closely follows the contour of the cylinder 250. Thus, with a cylinder disposed within the U-shaped recess 279, communication between adjacent chambers is effectively blocked off. The spacers 274 are formed with downwardly inclined surfaces 280 and 281 that are adapted to guide the code balls into the tubes 282 and 283, respectively. The tubes are secured to frame members 256 and 257 in any convenient manner, as by welding, and the top portions are broken away, as at 284 (Fig. 14), to provide lateral access for the code balls.

A pair of opposed right-angled side panels 285 extend lengthwise of the chamber assembly to seal off portions of the top and side regions of the chambers. The side panels 285 together with the tubes 282 and 283 completely seal off the sides of the chambers. The top wall of each chamber is formed by the bottom surface of a channel shaped silicon steel shield 286. The shield 286 provides a convenient mount for a sensing coil 287 and capacitor 288. The sensing coil 287 is wound on a tubular bobbin 289 through which the code balls must pass, and the shield 286 is formed with a central aperture 290 to permit the code balls to pass from the sensing coil into the chambers of the sensing unit.

The sensing coil and capacitor comprise a series resonant circuit, the tuning characteristics of which permit the sensing coil to distinguish a glass ball from a steel ball, and it has been found extremely important to provide adequate shielding for the individual sensing coils. Towards this end, a silicon steel washer 291 is telescoped over the tubular bobbin 289 to limit the distortion of the flux field of the sensing coil due to the presence of steel balls in the feed tubes immediately above the sensing coil. In addition, the silicon steel shield 286 provides shielding between the adjacent channels and prevents mutual coupling effects from detuning the series resonant circuits.

The functioning of the code stations is best shown in Fig. 12. When a ball drops down the tube 292, it strikes the surface of the cylinder 250 and is prevented from passing into the chambers of the cylinder. Thus the cylinder 250 supports the ball within the center portion of the sensing coil 287, and the sensing coil, in cooperation with appropriate circuitry, determines whether the ball is steel or glass. If the ball is steel, torque motor 254 is energized and drives the cylinder 250 clockwise, as viewed in Fig. 12. If the ball is glass, the torque motor 254 is oppositely energized to drive the cylinder 250 counterclockwise.

For purposes of explanation, it will be assumed that a steel ball is within sensing coil 287 and that the cylinder is driven clockwise. As the cylinder rotates to bring the pocket 269 into register with the opening in the sensing coil, the ball drops into the pocket and is carried around with the pocket until the pocket becomes downwardly inclined, at which time the ball rolls onto the inclined surface 280 of the spacer 274 and is guided into tube 282. The provision of the grooves 270 facilitates the above described action. During the rotation of the cylinder, the ball is supported within the sensing coil until the lead portion of the groove 270 comes in register with the central opening of the sensing coil, at which time the ball drops into the groove. The groove depth adjacent the pocket 269 is approximately one-half of a ball diameter, and as the pocket approaches the center of the sensing coil 287, the ball has pre-dropped approximately one-half of its diameter. Thus the grooves 270 assure the depositing of a ball in each pocket during every revolution of the cylinder. In addition, the pre-drop feature permits somewhat higher speeds of rotation resulting in a faster operating device.

It will be remembered that the verifier section, in addition to progressing the code groups, must also check to determine the correctness of the code groups. In order to carry out this dual function, the code station 126 of the verifier section is provided with a set of mechanical fingers 293, as shown in the fragmentary rear views of Figs. 16 and 17. There is a finger 293 for each pocket 128 of the verifier cylinder and they may be formed of spring steel or any other suitably resilient material. The fingers are secured to one of the side panels 285 by a nut 294 and a bolt 295 and provide a mechanical checking means for determining that a code ball has been deposited in each of the pockets.

Figure 16:
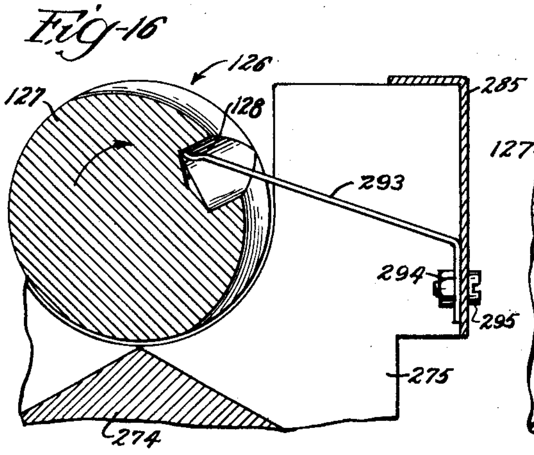
Figs. 16 and 17 are fragmentary vertical sectional views, as viewed from the rear, of the code station of the verifier section illustrating the operation of the mechanical fingers.
Figure 17:
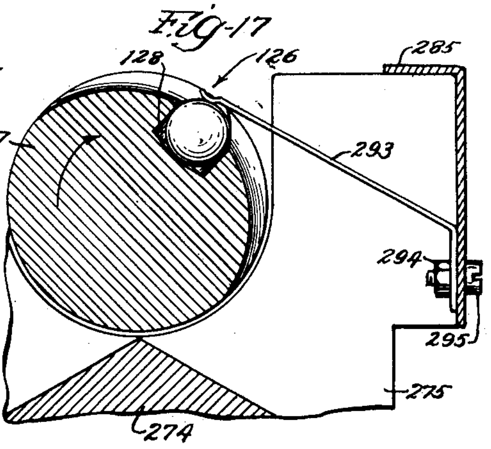
Figure 26:
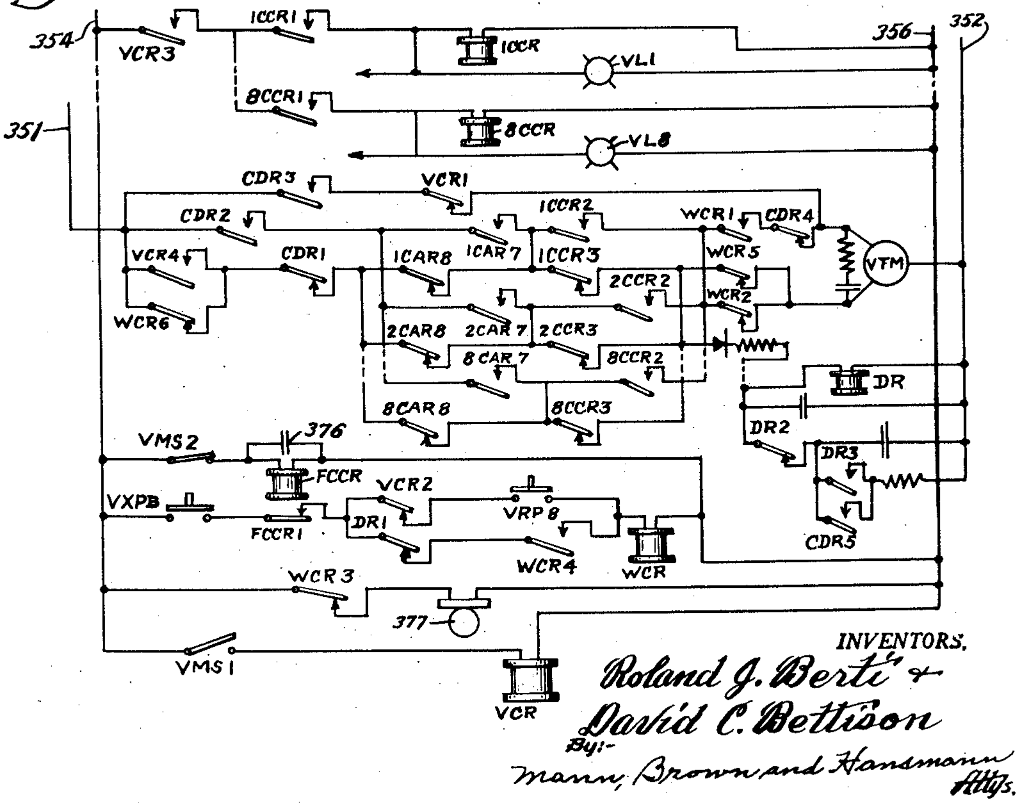
Fig. 26 is a diagram of the verifier cylinder's control circuitry.

As illustrated in Fig. 16, if no code ball is deposited in one of the pockets, the finger 293 is adapted to project into the pocket 128 and block the rotation of the cylinder 127. In this event a timing circuit, shown in Fig. 26, is permitted to time out and reverse the motor connections. The motor then rotates in a direction opposite to that indicated in Fig. 16 and discards the incomplete code group into the collecting hopper 214. When a code ball has been deposited in each of the pockets 128, finger 293 cams up over the surface of the code ball and permits the cylinder 127 to complete its cycle of rotation and deliver the code group to the tubes 132 of Fig. 5.

Each of the code stations includes a pair of cam operated micro-switches MS1 and MS2, as illustrated in Fig. 10. The micro-switches are controlled by the flat camming surfaces 300 and 301, shown on the sensing cylinder in Fig. 11. When the cylinder 250 is in its normal position, the camming surfaces 300 and 301 face downwardly. When the cylinder begins to rotate from its normal position, the arrangement is such that the camming surface 300 operates its associated micro-switch MS1 shortly before camming surface 301 actuates its micro-switch MS2, and when the cylinder approaches the completion of its cycle of rotation, the order of operation of the micro-switches is reversed.

All of the code stations in all sections of the apparatus are provided with similar micro-switches, but the positioning of the contacts varies somewhat. In the code station 126 of the verifier section of the apparatus the micro-switch VMS1 is open and the micro-switch VMS2 is closed when the cylinder 127 is in its normal position, and the flat camming surfaces are facing downwardly. In the code stations of the visible storage section and of the control section of the apparatus, the micro-switches VSMS1, VSMS2, KMS1, and KMS2 are all open when the cylinder is in its normal position and the flat camming surfaces are facing downwardly. The circuit functions of the various micro-switches associated with the code stations are described in connection with the particular circuits in which they are found.

*Transfer units*

Figure 18:
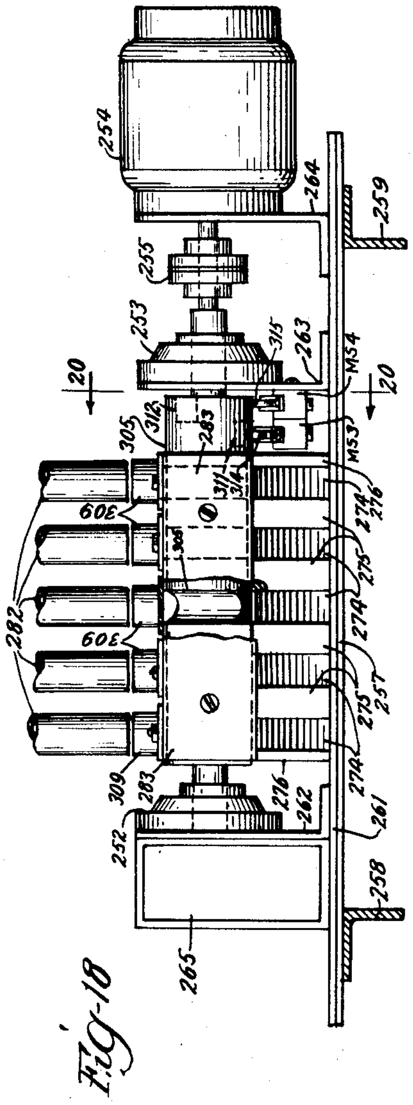
Fig. 18 is a side view partly in section of a code transfer station of the present invention.

A typical code transfer station, as shown in Fig. 18, includes a metallic transfer cylinder 305 journalled in suitable bearings 252 and 253 and operatively coupled to a torque motor 254. The transfer stations are similar to the code stations in many respects. Both types of units include a mounting tray 261 of channel shape that is adapted to slide into a pocket formed by the angle iron members 256 and 257. The rotatable cylinders in each unit are mounted in identical bearings and are coupled to identical torque motors. In addition, the construction of the chamber assembly is identical in both types of units, and for convenience of description, the portions of identical construction are given the same reference characters.

The major constructional difference between the code stations and transfer stations resides in the cylinders themselves. The transfer cylinder 305, as shown in Fig. 19, is provided with five aligned, axially spaced, semi-cylindrical notches corresponding to the pilot channel and the four code channels of Fig. 5, the notches being numbered 307, 307D, 307C, etc. Each of the notches is associated with one of the chambers of the transfer station.

Another difference between the two types of stations resides in the fact that the transfer stations have no sensing coils. The top wall of the chambers of the transfer station is formed by a flat plate 308, shown in Fig. 21. An upwardly projecting tubular stub 309 is fixed to the plate 308 and is in register with the lower end of the ball-conveying tube 282.

Figures 15, 21:
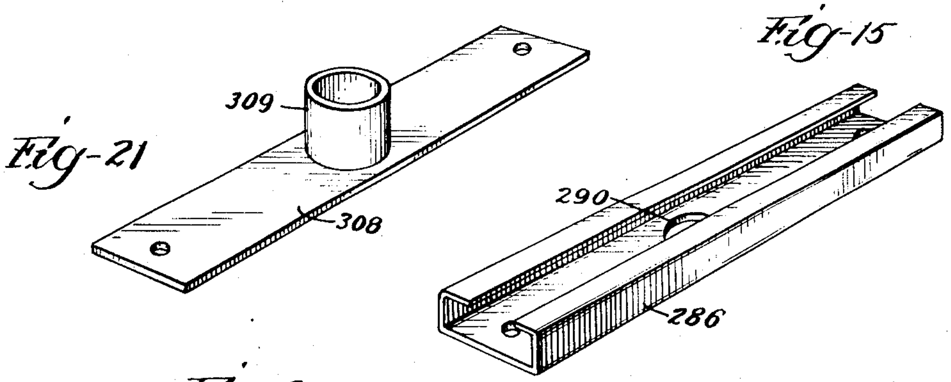
Fig. 15 is a perspective view of a mounting shield for the sensing coils of the present invention.
Fig. 21 is a perspective view of an inlet tube mount for a code station wherein a sensing coil is not employed.

As previously mentioned with reference to Fig. 6, sensing coils are omitted from certain of the code stations of the control section and in such instances an inlet tube mount of the type shown in Fig. 21 provides communication from the supply tubes to the code stations.

Finally, the transfer stations include a pair of micro-switches MS3 and MS4 adapted to be actuated by the camming pockets 311 and 312, respectively. The camming action between the transfer cylinder and its micro-switches is somewhat different than the camming action between the code station cylinder and its micro-switches.

The transfer cylinders perform their routing function by virtue of the angle of inclination of the notches 307, and they are controlled by the micro-switches in such a manner that they have only two stationary or operative positions. One of these positions is known as the substituting position and it is the position shown in Fig. 20. In this position the follower wheel 314 of micro-switch MS3 extends into the cam pocket 311 and micro-switch MS3 is open. The follower wheel 315 of micro-switch MS4 rides on the cylindrical surface and micro-switch MS4 is closed. With the transfer cylinder positioned as shown in Fig. 20 and the notch surface slanting downwardly to the left, the balls drop through the tubular stub 309, strike the inclined face of the notch, and are deflected to the left.

Figure 20:
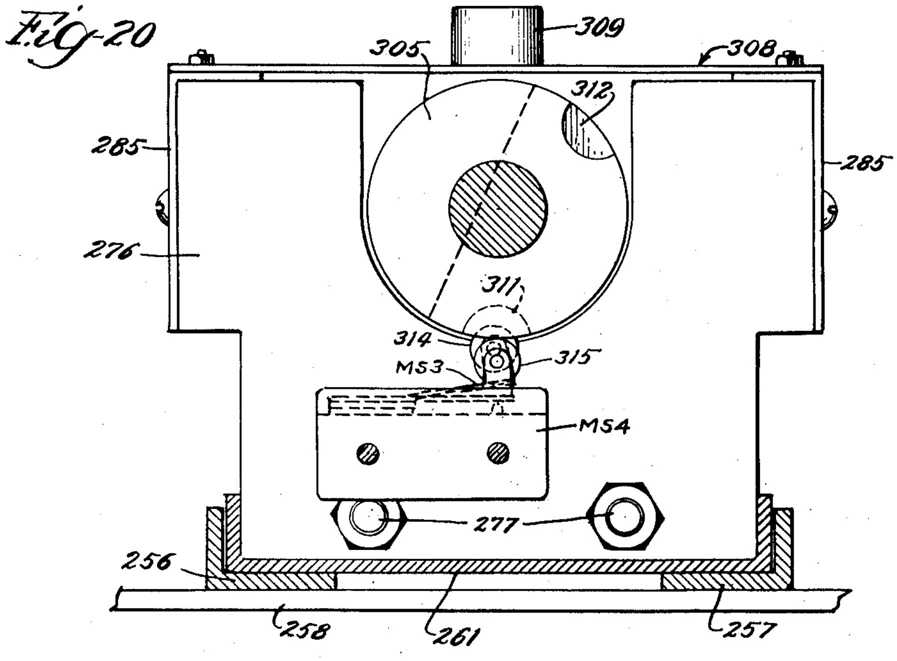
Fig. 20 is a sectional view taken in a vertical plane, as indicated by the line 20—20 of Fig. 18.

The other stationary position of the transfer cylinder 305 is reached by rotating the cylinder 100 degrees clockwise from the position in which it is shown in Fig. 20. This is known as the normal position and the follower wheel 315 of micro-switch MS4 will be within the cam pocket 312, and hence micro-switch MS4 will be open. The follower wheel 314 of micro-switch MS3 rides on the cylindrical surface and micro-switch MS3 is closed. In this position the notch surface deflects the code balls to the right.

The transfer stations constitute the mechanical apparatus for carrying out the desired cancelling and substituting operations and they are controlled by the circuitry of Figs. 27A and 27B. The micro-switches MS3 and MS4 appear in these circuits and limit the rotation of the transfer cylinders.

ELECTRICAL COMPONENTS OF THE APPARATUS OF THE INVENTION

From Fig. 27*a*, it is obvious that there are three separate electrical power supply systems for the control circuitry, namely, a 6,000 cycle audio frequency supply system for the sensing coils; a 60 cycle, 110 volt power supply for the torque motors and thyratron tubes; and a three wire direct current supply for the selector solenoids and control relays. To simplify the circuit diagrams, the filament power supply circuit of the thyratron tubes has been omitted.

The supply conductor for the audio frequency circuit is designated 350 and the supply conductor for the power frequency circuit is designated 351. A conductor 352 serves as a common return conductor for both the audio and power frequency circuits. The direct current power supply consists of the three conductors 354 (+26 volts), 355 (+12 volts), and 356 (common).

Due to the many relays in the control circuits, a code letter system of identification has been adopted to facilitate the description and understanding of the circuits. In accordance with this system, the relays controlled by sensing coils are indicated in terms of the channel in which the sensing coil is located. Thus, a sensing coil associated with the pilot channel is written as RP and a sensing coil associated with code channel A is written as RA. The system is further particularized in terms of the particular section of the apparatus in which the sensing coil is located. Thus a sensing coil associated with code channel B and located in the verifier section is written VRB; if located in the control section, it is written KRB.

In the case of the visible storage section, there is a further breakdown in order to distinguish the various levels from one another. Thus a pilot channel sensing coil located in the third level of the visible storage section is written VS3–RP.

Other relays controlled by track switches, cam operated micro-switches, etc., are given letter designations indicative of the function performed by the relay. For instance the code assembly relays are designated CAR and control section relays controlled by track detector circuits are designated KTR.

The present apparatus includes a large number of torque motors to which a similar reference system is applied. Where necessary, the torque motors that drive the code station cylinders are designated by suffix numeral 1 and the torque motors that drive the transfer cylinders are designated by suffix numeral 2.

Due to the complex nature of the circuitry, the various circuits are treated separately, and in so doing, the conventional system of arranging the contacts adjacent their controlling relay has not been followed rigorously.

*Code selector section*

The circuitry for this section is shown in Figs. 22 and 23 and includes a series of push buttons, designated PB1 to PB8, that correspond to receiving tracks 1 to 8, respectively. Each of the push buttons is arranged in series with a separate code assembly relay CAR that is normally de-energized so that when the appropriate push button is actuated, its associated CAR relay will be picked up in the usual manner. The eight series circuits of Fig. 22 are fed from a common 26 volt direct current power supply over the lines 354 and 356.

Referring now to Fig. 23, there is schematically illustrated the various solenoids that actuate the selector shuttles 118 and 119 of Figs. 5 and 6. The solenoid associated with the pilot channel is designated 122. The solenoids associated with the A channel are designated 122A and 123A and so on. A total of nine solenoids are required, one for the pilot channel and two for each of the four code ball channels.

The solenoids are adapted to be connected with a 26 volt direct current power supply through any one of eight different sets of contacts. There are five contacts in each set, one for the pilot channel and one for each of the four code channels. Each set of contacts is controlled by one of the code assembly relays of Fig. 22. For instance, the contacts 1CAR1, 1CAR2, etc., are controlled by code assembly relay 1CAR. Each of the sets of contacts is connected to the solenoids so that the correct permutational code group, corresponding to the desired storage track, is selected by the selector shuttles. For example, if it is desired to select a code group corresponding to track 3: there will be a steel ball in the pilot channel, contact 3CAR1 is in series with solenoid 122; a glass ball in channel D, contact 3CAR2 is in series with solenoid 123D; a glass ball in channel C, contact 3CAR3 is in series with solenoid 123C; a steel ball in channel B, contact 3CAR4 is in series with solenoid 122B; and a steel ball in channel A, contact 3CAR5 is in series with solenoid 122A.

As explained previously, with reference to Figs. 5 and 6, each of the code ball reservoirs includes a screw conveyor 114 that feeds the code balls to the selector shuttles. These screw conveyors are powered by the torque motors 360 and 361. The electrical control circuit for these motors is included in Fig. 22.

A normally open front contact MR1 disconnects the motors 360 and 361 from their power supply. The contact MR1 is controlled by a relay MR that is energized by the picking up of relay CDR and the closing of its associated contact CDR4.

If it is desired to route a given car to track No. 3, push button PB3, which is located on the console shown in Fig. 7, is depressed to pick up code assembly relay 3CAR. When this relay is picked up, it closes normally open contacts 3CAR1 to 3CAR5 thereby simultaneously closing certain of the solenoid circuits to energize the solenoids and actuate the appropriate selector shuttles.

In addition, normally open front contact 3CAR6 is also closed when relay 3CAR is picked up and this completes a pickup circuit for relay CDR, thereby closing contact CDR4 and energizing relay MR. When relay MR picks up, it closes front contact MR1 to complete the power supply circuit for the reservoir motors and actuate the screw conveyors disposed in each of the reservoirs. Relay MR is also provided with a second normally open front contact MR2 that is in series with a delay capacitor 363, and this series circuit is shunted across the terminals of the MR relay. This provides relay MR with a slow release characteristic in order to permit the screw conveyor motors to run for a substantial length of time and thereby insure a constant supply of code balls.

With the above arrangement, the screw conveyor motors will only be energized when cars are being selected and stored in the apparatus, at which time they are automatically turned on and off.

*Verifier section*

After selection by the shuttles, the balls drop into verifier sensing coils associated with each of the channels. Each of the sensing coils is located in an audio frequency resonant circuit, as shown in Fig. 24.

Since each of the resonant circuits associated with the sensing coils is identical, only one such circuit is shown in detail. The dotted line rectangle enclosing a portion of this resonant circuit is repeated for each of channels A, B, C, and D to indicate the identical circuit portions, and it is not believed necessary to reproduce the detailed arrangement of the component elements.

The circuit includes an audio frequency source of supply 350, preferably of about 6,000 cycles, a standard 60 cycle A.C. source of supply 351, and a common return conductor 352 for both the audio frequency and 60 cycle supplies. The sensing coil 130 is connected in series with an adjustable trimmer condenser 365 and a potentiometer 366, and this series circuit is bridged across the conductors 350 and 352 to receive the audio frequency power. The trimmer condenser 365 is made adjustable so that the series circuit may be tuned to a resonant condition. The sensing coil distinguishes between glass balls which do not upset the resonant circuit and steel balls which increase the inductance of the sensing coils thereby detuning the resonant circuit. A thyratron tube T is connected with its plate in series with a relay VRP, and this series circuit is bridged across the 60 cycle A.C. power supply, the relay VRP being connected to conductor 351, and the cathode of the thyratron tube to conductor 352. The potentiometer tap 368 is connected to a germanium diode 369 that is connected with the return conductor 352 through a charging capacitor 370. A battery 372 is connected from a point intermediate the diode 369 and the charging capacitor 370 to the grid of the thyratron tube. A grid leak resistor 373 connects the grid and cathode in the usual manner.

As is well known, the resonant condition of a series circuit is the condition of least impedance, and hence a maximum current flows from conductor 350 through sensing coil 130, trimmer condenser 365, and potentiometer 366, to return conductor 352 to produce a maximum voltage drop across the potentiometer. This voltage drop is of a constantly changing polarity, but due to the rectifying action of the germanium diode 369, the capacitor 370 becomes charged, as shown. The various parameters are arranged so that the capacitor 370, which is connected to the grid of the thyratron tube through the small battery 372, is effective to bias the thyratron tube to cut off. Thus, when the series resonant circuit is in its resonant condition, the thyratron tube is non-conductive and the relay VRP is de-energized.

Assuming first that a glass ball is deposited within the sensing coil 130, it will be noted that no change occurs in the inductance of the sensing coil. Hence, the series resonant circuit remains in its resonant condition and maintains the negative bias on the thyratron tube. Thus, a glass ball will not cause the relay VRP to become energized.

Assuming now that a steel ball is deposited within the sensing coil, it will increase the inductance thereof, thereby detuning the series resonant circuit and greatly increasing its impedance. This reduces the current flow and also the voltage drop across the potentiometer. As the charge on the capacitor 370 leaks off through the grid leak resistor 373, the biasing effect of capacitor 370 is reduced. The arrangement is such that the small battery 372 sufficiently counteracts the biasing effect of the capacitor 370 to permit the thyratron tube T to fire and establish a circuit from conductor 351 through relay VRP and the plate and cathode of the thyratron tube to return conductor 352.

So long as the steel ball remains in the sensing coil, the thyratron will fire during each positive half cycle of the 60 cycle power supply and maintain relay VRP picked up, but as soon as the steel ball leaves the sensing coil, the series resonant circuit will return to its condition of resonance and re-establish a sufficiently negative grid bias to cause the tube to cut off. A capacitor 375 is shunted across the terminals of relay VRP to act as a filter and prevent chattering due to the pulsating D.C. current produced by the rectifying action of the thyratron tube when the steel ball is within the sensing coil.

Therefore, when a code selecting push button is depressed and the selector shuttles select a group of five code balls, one ball will be deposited in each of the five sensing coils 130, and depending upon whether the ball be steel or glass, the associated relay will either be picked up or will remain de-energized. Each of the relays VRP, VRA, VRB, VRC, and VRD has associated therewith a group of contacts which are connected into a relay tree arrangement, as shown in Fig. 25.

Assuming now that the code group of balls which are deposited in the sensing coils associated with the verifier unit correspond to a car that is destined for track 3, that is, there is a steel ball in the pilot channel and in code channels A and B and there is a glass ball in code channels C and D, relays VRP, VRA, and VRB will pick up and relays VRC and VRD will remain de-energized. Thus, the code group establishes an electrical path in the relay tree circuit through the following contacts: front contact VRP1, front contact VRA1, front contact VRB1, and back contact VRC2, to pick up code checking relay 3CCR and indicator light VL3. Indicator light VL3 is situated on the console shown in Fig. 7 and enables the operator to immediately ascertain that the proper code group corresponding to the push button which he has depressed has been selected. The code checking relays have a series of contacts which are found in another portion of the verifier circuitry that is shown in Fig. 26.

There are two important checking functions that the verifier must perform. It must determine whether a steel ball has been deposited in the code channels in accordance with the requirements of the desired permutational group and it must also determine that a glass ball has been deposited in each of the remaining channels. The circuitry of Fig. 26, in cooperation with the mechanical fingers of Figs. 16 and 17, accomplishes both of these functions and, in addition, upon detecting an erroneous code group, automatically controls the code station cylinder 127 of the verifier unit 126 to cause it to dump the erroneous code groups into the collecting hopper 213.

The sensing coils and relay tree circuitry of Fig. 25 are employed to determine that the right arrangement of steel balls has been selected and the mechanical feelers are employed to determine that one ball has been deposited in each channel. It should be noted that the abscence of a steel ball will be detected by both checking systems; however, the absence of a glass ball will only be detected by the mechanical feelers.

Each of the checking or verifying arrangements is associated with a timing circuit, the timing circuit for the mechanical feeler system including a full code checking relay FCCR and the timing circuit for the steel ball verifying arrangement including a delay relay DR. If either of these relays are permitted to time out, it will open the supply circuit for the wrong code relay WCR which has contacts WCR1, WCR2, and WCR5 in the motor control circuit for the verifier cylinder's torque motor VTM. The arrangement is such that when relay WCR is energized, the torque motor will rotate in one direction, whereas when the WCR relay drops out and reverses its contacts, the torque motor will rotate in the opposite direction.

The verifier circuitry also includes a pair of cam operated micro-switches VMS1 and VMS2, the cam surfaces being located on the verifier cylinder 127. Switch VMS1, which is normally open, is cammed closed after a limited amount of rotation of the sensing cylinder 127. The closing of micro-switch VMS1 energizes relay VCR thereby opening contact VCR1 to temporarily stop the rotation of the verifier cylinder. If the verifier determines that the right arrangement of steel balls has been made, then the torque motor is re-energized and continues its rotation causing micro-switch VMS2, which is normally closed, to cam open. At this time, the relay FCCR begins to time out, but if a ball has been deposited in each of the pockets of the cylinder, the mechanical fingers will not block the cylinder's rotation and it will complete its cycle before relay FCCR times out. However, should a ball be missing from one of the pockets, the mechanical fingers will engage the pocket and stop rotation of the cylinder during which time microswitch VSM2 being open will cause relay FCCR to time out under the influence of capacitor 376, thus dropping relay WCR and reversing the motor control circuit for torque motor VTM. The torque motor then will reverse its direction of rotation and deliver the code group to the dumping tubes of the verifier unit.

The code checking relays CCR and lights VL which are shown in Fig. 25 as being fed through conductors 401 to 408 have again been shown in Fig. 26 as connected to the circuitry of Fig. 26 through conductors 401A to 408A in order to lend continuity to the diagrams and to facilitate the explanation of the cooperation of the circuits of Figs. 22, 23, 24, 25, and 26.

When power is first turned on, the vertifier must be restored to its operative position by depressing the verifier restoring push button VRPB (Fig. 26). This picks up relay WCR which remains picked up by a circuit from conductor 354 through the normally closed contacts of a verifier cancelling push button VXPB, contact FCCR1, contact DR1, and contact WCR4, to conductor 356. At the instant that power was turned on, the full code checking relay FCCR picked up through a circuit from conductor 354 through micro-switch VMS2 to conductor 356 to close contact FCCR1.

While in the previous illustrative description of the circuit operation, reference was had to track 3, it is preferred now to describe the operation of the verifier circuitry in connection with track 2 in order that a more comprehensive understanding of the overall operation of the present invention may be had.

The sequence of operation of the verifier unit circuitry is as follows: Push button PB2 is pressed in order to select a code for track 2 and this picks up relay 2CAR to energize the code assembly solenoids and make up the code group for track 2. In addition, contact 2CAR6 closes to pick up relay CDR, thereby closing contact CDR3 and starting the verifier torque motor VTM. The supply circuit extends from conductor 351 through contacts CDR3 and VCR1 to conductor 352. As the verifier cylinder rotates, micro-switch VMS1 closes, thereby picking up relay VCR. The picking up of relay VCR opens contact VCR1 and isolates the torque motor VTM from its power supply.

Simultaneously, with the picking up of relay CDR and the closing of contact CDR3, contact CDR2 closes and contact CDR4 opens. Thus there is a circuit established from conductor 351 through contacts CDR2, 2CAR7, which closed when PB2 picked up relay 2CAR and 2CCR3 to delay relay DR and conductor 352. The opening of contact CDR4 maintains the torque motor de-energized. Thus the DR relay, under the control of its associated timing circuit, begins to time out to pick up.

In the meantime, the code group has been selected by the shuttles and has been deposited within the sensing coils associated with the verifier cylinder, and if the verifier sensing coils under the control of the steel balls in the code group senses that the correct code group for track 2 is present, the relay tree will pick up relay 2CCR and light VL2. The code checking relay 2CCR and light VL2 are sealed in by contact VCR3 and contact 2CCR1 (not shown) until micro-switch VMS1 is cammed open by the verifier cylinder. The picking up relay 2CCR opens contact 2CCR3 thereby isolating the delay relay DR and preventing its timing circuit from timing out. The DR relay remains de-energized and the supply circuit of relay WCR, which includes contact DR1, is maintained. Therefore, contact WCR1 stays closed and contacts WCR2 and WCR5 stay open. At this point, contacts VCR1 and CDR4 are open and the torque motor VTM is isolated.

Thus, in the case where the sensing coils of the verifier sense the right arrangement of steel balls, the system comes to a standstill until the operator, in response to the correct light indication VL2, releases push button PB2. The release of push button PB2 drops out relay 2CAR and CDR which, inter alia, causes contacts CDR1, CDR4, and 2CAR8 to close. A motor supply circuit is thus established from conductor 351 through contacts VCR4, CDR1, 2CAR8, 2CCR2, WCR1, and CDR4 to conductor 352 and the motor continues its original cycle of rotation.

The continued rotation of the verifier cylinder opens micro-switch VMS2 and the energized relay FCCR begins to time out to drop out. The size of the capacitor 376 determines the dropout time of the relay, and the arrangement is such that the cylinder is able to complete its cycle of rotation, thereby closing micro-switch VMS2 and restoring the power supply circuit for relay FCCR.

If for any reason, however, one of the balls of the code group is not deposited within its pocket in the cylinder, the mechanical feelers, instead of camming over the surface of the ball (Fig. 17) and permitting the cylinder to continue its rotation unimpeded, will project into the pocket (Fig. 16) and block the rotation of the cylinder. In such a case, relay FCCR will drop out, thereby opening contact FCCR1 and de-energizing relay WCR. The dropping out of relay WCR opens contact WCR1 and closes contacts WCR5 and WCR2. This establishes a motor supply circuit from conductor 351 through contacts VCR4, CDR1, 2CAR8, 2CCR2, and WCR2 to conductor 352. It will be noted that the dropping out of relay WCR has now caused the torque motor connections to be reversed, and hence the torque motor will reverse its direction of rotation and discard the defective code group into the collecting hopper. As the cylinder returns to its original position, micro-switch VMS1 will open thereby de-energizing relay VCR and opening contact VCR4 to stop the torque motor. After the verifier unit has acted to reject an erroneous code, it is always necessary before making any additional code selections to press the verifier restoring button and re-energize relay WCR. This is necessary in order to orient the power supply circuit for the torque motor for the correct direction of rotation.

The above explanation concerned an erroneous code group of the type in which the error consisted of the omission of a glass ball and there follows an explanation in which the error consists of an incorrect arrangement of the steel balls.

It will be remembered that relay CDR was also picked up by the closing of contact 2CAR6 and that contact CDR2 closed to complete a power supply circuit from conductor 351 through contacts CDR2, 2CAR7, and 2CCR3 to initiate the timing circuit associated with relay DR. Simultaneously, contact CDR4 opened to isolate the torque motor from its power supply.

If the vertifier sensing coils sense the wrong code, then some other code will pick up on the relay tree, for instance, the code corresponding to track 1, and thus light VL1 and relay 1CCR will be picked up and sealed in through contacts VCR3 and 1CCR1 until micro-switch VMS1 is cammed open by the verifier cylinder.

After the initial rotation of the torque motor has caused micro-switch VMS1 to close, thereby energizing relay VCR and opening contact VCR1 to isolate the motor, the fact that CDR1 is open prevents one of the supply circuits from becoming operative and the other supply circuit, which runs from the now closed contact CDR2 through contacts 2CAR7 and 2CCR3, is also inoperative because contact WCR5 is open. However, this last mentioned circuit is still effective to cause relay DR to time out and pick up, thereby opening contact DR1 and de-energizing relay WCR. The dropping out of relay WCR opens contact WCR1 and closes contacts WCR2 and WCR5. If push button PB2 is still depressed, torque motor power is supplied through contacts CDR2, 2CAR7, 2CCR3, and WCR5. If, on the other hand, push button PB2 has been released, torque motor power is supplied through contacts VCR4, CDR1, 2CAR8, 2CCR3, and WCR5, and also from a circuit consisting of contacts VCR4, CDR1, 1CAR8, 1CCR2, and WCR2, and also from a circuit consisting of contacts VCR4, CDR1, 3 through 8 CAR8, 3 through 8 CCR3, and WCR5. Once the cylinder has reversed its rotation and opened VMS1, thereby dropping relay VCR, it will continue to rotate, being supplied by a circuit through contacts WCR6, CDR1, 1 and 3 through 8 CAR8, 1 and 3 through 8 CCR3, and WCR5 if push button PB2 is released, or if push button PB2 is still depressed, through a circuit comprising contacts CDR2, 2CAR7, 2CCR3, and WCR5, and this rotation will continue until such time as the verifier restoring push button is pressed and the verifier is restored to its normal condition.

It should be noted that everytime that relay WCR drops out, a warning buzzer 377 is sounded by the closing of contact WCR3, and this buzzer, in cooperation with the indicating lights, insures that the operator will detect the occurrence of a wrong code and take the appropriate action of restoring the verifier and selecting another code group.

*Visible storage section*

The principal circuitry for this section is shown in Figs. 27A and B. The circuit shown in these figures includes the pilot ball sensing coils 141, 149, 156, and 163 located at each of the four levels of the visible storage section and is adapted to control the torque motors associated with each of the rotatable code station cylinders and each of the rotatable transfer cylinders of the visible storage section.

The principal function of this circuitry is to control the cascading of the code groups through the successive levels of the visible storage section and also to control any cancelling and substituting operations that may be required.

It should be noted that all of the above functions are controlled solely by the pilot channel sensing coils and that the code channel sensing coils exert no influence on any of the above enumerated control functions. The code channel sensing coils find their application in controlling the arrangement of the various contacts of the relay tree circuitry of the type shown in Fig. 3. There is one such relay tree circuit for each level of the visible storage apparatus and each of these circuits is connected with a corresponding row of lights provided on the display panel 165 of the console of Fig. 7. It is deemed appropriate to merely point out that the various contacts in each relay tree are controlled by relays located in resonant circuit arrangements of the type shown in Fig. 24 and hence they assume one position when a steel ball is deposited within the sensing coil and the opposite position when a glass ball is deposited within the sensing coil.

Referring now to Figs. 27A and B, the relays associated with the pilot ball channel resonant circuits are designated VS4–RP, VS3–RP, VS2–RP, and VS1–RP, and these relays are controlled by the pilot channel sensing coils of the fourth, third, second, and first levels, respectively, of the visible storage section. The resonant circuit arrangements are substantially identical with the circuit of Fig. 24, the only difference being that an additional capacitor 378 is adapted to be connected in parallel with the charging capacitor 370.

This additional capacitor is switched in and out of the circuit by means of a pair of contacts VS4–RP4 and VS4–RP5 which are arranged in flip-flop fashion. The arrangement is such that when no steel pilot ball is within the sensing coil 141, the series resonant circuit is in its resonant condition and a relatively high negative bias is maintained on the grid of the thyratron tube T and the relay VS4–RP remains de-energized. In this condition, the additional capacitor 378 is operatively connected in parallel with the charging capacitor 370.

Assuming now that a steel ball is deposited within the sensing coil, the current in the series resonant circuit immediately decreases and the negative bias maintained by the parallel capacitors slowly leaks off over a path provided by the grid leak resistor 373. The additional charging capacitor 378 delays the firing of the thyratron tube by providing an increased amount of stored energy which necessarily requires a longer time for the leakage path through the grid leak resistor to lower the grid bias sufficiently to permit the tube to fire.

In this connection it should be noted that simultaneously with the depositing of a steel ball in the pilot channel sensing coil, the other balls of that particular code group will also be deposited in the sensing coils associated with channels A, B, C, and D. The resonant circuits with which the code channel sensing coils are associated, as previously stated, are of the type shown in Fig. 24 and, hence, are faster acting than is the resonant circuit of Figs. 27A and B. This permits the relays associated with the code channel sensing coils to pick up first and to stabilize the contact arrangement of the relay tree before the relay VS4–RP is energized to complete the relay tree circuit of Fig. 3 and actuate a light on the display panel 165 of the console. The relay VS4–RP is provided with a normally open front contact VS4–RP3 which is in series with the relay tree circuit for that particular level of the visible storage section. Thus, the additional charging capacitor eliminates the tendency of the indicator lights located on the console to flicker.

It should be noted that after the additional charging capacitor has completed its delaying function and relay VS4–RP has picked up, the contacts VS4–RP4 and VS4–RP5 will flip-flop to short out the additional charging capacitor. This insures that upon the leaving of the steel pilot ball, the negative bias on the thyratron tube will be built up swiftly and the relay VS4–RP will have a quick release.

The cascading circuitry includes cam relays VS4–CR, VS3–CR, VS2–CR, and VS1–CR adapted to be energized by the closing of one of the cam operated micro-switches that are associated with each cylinder. The micro-switches associated with the code station cylinders of the fourth, third, second, and first levels of the visible storage section circuitry are designated, respectively, VS4–MS1, VS4–MS2, VS3–MS1, VS3–MS2, VS2–MS1, VS2–MS2, VS1–MS1, and VS1–MS2; the micro-switches containing the suffix numeral 1 open slightly before and close slightly after the micro-switches designated by suffix numeral 2. The micro-switches associated with the transfer cylinders of the third, second, and first levels of the visible storage section circuitry are designated, respectively, VS3–MS3, VS3–MS4, VS2–MS3, VS2–MS4, VS1–MS3, and VS1–MS4; the micro-switches containing the suffix numeral 3 being open only when the transfer cylinders are in the substituting position and those containing the suffix numeral 4 being open only when the transfer cylinders are in the normal position. The torque motors for the code station cylinders are designated by VS–TM1 and the torque motors for the transfer cylinders are designated VS–TM2. Transfer cylinders are shown only for levels 1, 2, and 3 and not for the fourth level. This arrangement in the present apparatus is due to the fact that space limitations prohibited the use of a transfer cylinder in the fourth level.

The operation of the cascading circuitry of the visible storage section is best understood by tracing the successive operations during the classification of a typical train. In setting up the routings for the successive cars in the train, a code group corresponding to the routing path of the first car is selected, verified, and fed to the blind storage section of the apparatus. Assuming the apparatus to be completely empty, the first code group travels through the blind storage tubes and ultimately drops into the sensing coils associated with the fourth level of the visible storage section. It should be noted that in the circuit of Figs. 27A and B, only the sensing coils for the pilot ball channel are shown and these coils always receive a steel pilot ball.

Therefore, the first event is the depositing of a steel ball in sensing coil 141 of Fig. 27A. This detunes the resonant circuit and causes the thyratron tube to fire and pick up relay VS4–RP. When relay VS4–RP picks up, it closes contact VS4–RP1 to establish a circuit from supply line 351 through contacts VS3–RX5, VS3–RP5, VS4–RP1, and VS4–CR1, and energizes torque motor VS4–TM1 to drive its associated cylinder 140 counterclockwise. As the cylinder rotates, the cam actuated micro-switch VS4–MS1 closes to take control of the torque motor away from relay VS4–RP. Shortly thereafter, cam operated micro-switch VS4–MS2 closes to pick up cam relay VS4–CR. As the cylinder continues to rotate, the steel ball drops through sensing coil 141 thereby causing relay VS4–RP to drop out and open contacts VS4–RP1 and VS4–RP2. As the cylinder nears completion of its cycle of rotation, micro-switch VS4–MS2 opens first to de-energize relay VS4–CR, and shortly afterwards micro-switch VS4–MS1 opens to isolate torque motor VS4–TM1 from its source of supply.

In the meantime, the first steel ball has cascaded through the system and has been deposited in sensing coil 149 associated with the third level of the visible storage section. The procedure described hereinabove will be repeated in the third level. The steel ball will cause relay VS3–RP to pick up, thus closing a circuit from supply line 351 through contacts VS2–RX5, VS2–RP5, VS3–RP1, and VS3–CR1 to energize torque motor VS3–TM1 associated with the cylinder 147 of the third level of the visible storage section. Its rotation will successively close micro-switches VS3–MS1 and VS3–MS2, and upon completion of one cycle of rotation, micro-switch VS3–MS1 will open to de-energize the motor. In a similar manner, the first steel ball will be passed from the third sensing coil to the second and thence from the second to the first sensing coil 163 located in the first level of the visible storage section.

When the first steel ball is deposited in sensing coil 163, it causes relay VS1–RP to pick up and close contact VS1–RP1, but torque motor VS1–TM1 remains de-energized because this circuit is held open by contact ATR1 which is controlled by a track relay ATR (not shown). The track relay picks up when a car passes over the approach section of the track layout. Assuming that the cars are not yet being humped, contact ATR1 remains open and retains the first steel pilot ball within sensing coil 163. So long as the steel ball is within the sensing coil 163, the relay VS1–RP is picked up and maintains contacts VS1–RP3 and VS1–RP4 open. These contacts are located in the control circuitry for torque motor VS2–TM1 and cam relay VS2–CR, respectively.

When a second code group is selected, it also travels through the blind storage tubes 138 and the steel pilot ball drops into sensing coil 141. The circuitry of Figs. 27A and B operates in the same manner as previously described to cause the second group of code balls to cascade from the fourth level to the third level and then from the third level to the second level, but because of the presence of a steel ball in sensing coil 163, the second code group stops at the second level of the visible storage section. Due to the presence of the steel pilot ball in sensing coil 156, relay VS2–RP picks up, and though it closes contact VS2–RP1, the motor supply circuit for torque motor VS2–TM1 is held open by contact VS1–RP3 under the control of relay VS1–RP. Relay VS2–RP is also provided with a pair of contacts VS2–RP4 and VS2–RP5 that are located in the supply circuits for torque motor VS3–TM1 and cam relay VS3–CR, and they serve to isolate the same from their power supplies.

When a third code group is selected, the pilot ball is deposited in sensing coil 141 and cascades to sensing coil 149 in the usual manner, and though the presence of the pilot ball will cause relay VS3–RP to pick up and close contact VS3–RP1, no further cascading takes place due to the now open contact VS2–RP5. However, relay VS3–RP is also provided with a pair of contacts VS3–RP4 and VS3–RP5 located in the supply circuit for torque motor VS4–TM1 and cam relay VS4–CR. As the fourth code group is selected and deposited in the sensing coils of the fourth level of the visible storage section, relay VS4–RP once again picks up, and though contact VS4–RP1 closes, an open circuit in the power supply of torque motor VS4–TM1 is maintained by the now open contact VS3–RP5. All subsequent code groups travel through the blind storage section and pile up on top of the balls located within the sensing coils of the fourth level of the visible storage section until the entire train has been stored in the apparatus.

Assuming now that the classification operation begins, a switch engine will push the first car to be classified across the approach section 101 to the main switch SW1–8 and over the hump. As the first car passes over the approach section, a track relay ATR (not shown) picks up, thus causing contact ATR1 to close and complete a supply circuit for torque motor VS1–TM1 from supply conductor 351 through contacts ATR1, VS1–RP1, and VS1–CR1. Torque motor VS1–TM1 drives its associated sensing cylinder 161 clockwise, thereby closing in quick succession micro-switches VS1–MS1 and VS1–MS2. As the cylinder rotates, the steel ball within sensing coil 163 drops out and cascades to the first control unit 168, and micro-switch VS1–MS1 opens to de-energize torque motor VS1–TM1 after one complete cycle.

Since the steel ball in sensing coil 163 has dropped out, relay VS1–RP also drops out and contact VS1–RP3 closes to complete the motor supply circuit of torque motor VS2–TM1 and cause the second pilot ball to cascade into the first level. As the second pilot ball leaves sensing coil 156, the associated relay VS2–RP drops out and contact VS2–RP5 closes. Contact VS2–RP5 is in the motor supply circuit for torque motor VS3–TM1, and its closing completes the circuit and cascades the third steel ball from sensing coil 149 to sensing coil 156. Similarly, the leaving of the third steel ball from sensing coil 149 will cause relay VS3–RP to drop out and permit contact VS3–RP5 to close, thus energizing torque motor VS4–TM1 which will cascade the fourth steel ball from sensing coil 141 to sensing coil 149.

It should be noted that the fifth steel ball, which was resting directly on the fourth steel ball, drops into sensing coil 141 as soon as the fourth steel ball leaves, and therefore the fifth steel ball is deposited in sensing coil 141 before the fourth steel ball reaches sensing coil 149. Because of this fact, contact VS3–RP5, which normally prevents cascading from the fourth level to the third level, will be closed because relay VS3–RP will have dropped out after the third ball left and before the fourth ball arrived. Thus it may be seen that because the subsequent code groups have piled up at the fourth level, the heretofore described safeguards are not sufficient to prevent the undesired cascading of the fifth ball.

In order to cure this difficulty, a delaying capacitor 380 is shunted across the terminals of control relay VS4–CR and the circuit operates in the following manner. When the third ball leaves sensing coil 149 causing relay VS3–RP to drop out and permitting contact VS3–RP5 to close, because of the presence of the fourth ball in sensing coil 141, relay VS4–RP will be picked up and contact VS4–RP1 will be closed to complete the motor supply circuit for torque motor VS4–TM1. Thus, torque motor VS4–TM1 is energized and drives its associated cylinder 140 counterclockwise to cascade the fourth ball from sensing coil 141 to 149. As the cylinder begins to rotate, micro-switches VS4–MS1 and VS4–MS2 will close in quick succession. The closing of micro-switch VS4–MS2 causes cam relay VS4–CR to pick up.

It remains picked up through contact VS3–RP4, which is now closed because the fourth ball is in transit from sensing coil 141 to 149; contact VS4–RP2, which is closed because the fifth ball is already in sensing coil 141; and its own contact VS4–CR. Thus, when the cylinder 140 of the fourth level completes its cycle of rotation and automatically opens micro-switch VS4–MS1, it will be isolated from its power supply even though contact VS3–RP5 is closed (the fourth steel ball is still in transit from sensing coil 141 to sensing coil 149) and even though contact VS4–RP1 is closed (the fifth steel ball is already within sensing coil 141) because contact VS4–CR1 is now open, it having been opened at the time that cam relay VS4–CR became energized. And it will remain open until relay VS4–CR drops out.

The next event is the arrival of the fourth ball within sensing coil 149 and this, of course, picks up relay VS3–RP and causes contacts VS3–RP4 and VS3–RP5 to open. Upon the opening of contact VS3–RP4, cam relay VS4–CR is disconnected from its power supply, but its dropout is delayed during the time that the stored energy in the shunting capacitor 380 is being dissipated in relay VS4–CR. The dropping out of relay VS4–CR takes place after the opening of contacts VS4–RP4 and VS4–RP5 which are safely open before contact VS4–CR1 is again permitted to close. Thus, when contact VS4–CR1 closes, torque motor VS4–TM1 remains isolated because contact VS3–RP5 has previously opened. It should be evident that the tendency for the fifth ball to immediately cascade from the fourth level to the third level, due to the fact that the fifth ball arrives in sensing coil 141 before the fourth ball arrives in sensing coil 149, is completely blocked by the delaying action of the shunting capacitor 380 associated with relay VS4–CR.

From the above, it may be seen that each time a cut of cars passes over the approach section and energizes the associated track relay, the code group at the first level of the visible storage section will cascade into the control section of the apparatus and the subsequent code groups will each advance one level.

In some instances it is possible that the cut of cars being classified may be of such length that the code group at the second level will arrive at the first level before the tail end of the particular cut of cars has cleared the approach section. In other words, the track relay ATR (not shown) is still energized and contacts ATR1 and ATR2 are still closed at the time that the second level's code group arrives at the first level, and thus there will be a tendency for this code group to immediately cascade into the control section. This tendency is blocked by a cam relay VS1–CR and its associated contacts. When the first cut of cars energizes the track relay and closes contact ATR1 to thereby energize torque motor VS1–TM1, the initial rotation of the associated sensing cylinder closes micro-switches VS1–MS1 and VS1–MS2. The closing of micro-switch VS1–MS2 picks up relay VS1–CR which remains picked up through contact ATR2 and its own contact VS1–CR2. So long as the cut of cars is effective to maintain the track relay ATR de-energized and thus to keep contact ATR2 closed, relay VS1–CR will also be picked up. Therefore, though contact ATR1 remains closed for an unusually long period of time due to the length of the cut of cars being classified, and though contact VS1–RP1 is closed because the code group from the second level has arrived at the first level, torque motor VS1–TM1 will not cause any further cascading because contact VS1–CR1 is held open by relay VS1–CR which is struck up by contact ATR2. It should be obvious that contact ATR1 will open before contact VS1–CR1 will close.

*Cancelling and substituting*

The cancelling and substituting functions are also performed by the circuitry, shown in Figs. 27A and B, in cooperation with the transfer cylinders which are shown in their normal position in Fig. 5. In explaining these functions, it will be assumed that there is one code group at each level of the visible storage section and many other code groups stored in the blind storage section. The relays VS1–RX, VS2–RX, and VS3–RX perform the cancelling function and are adapted to be picked up by depressing push buttons XPB1, XPB2, and XPB3, respectively. These push buttons are located on the console of Fig. 7.

In connection with the cancelling function, it should be noted that the transfer cylinders must be capable of rotating in both directions and thus the motor control circuitry therefor must be capable of energizing the torque motors VS1–TM2, VS2–TM2, and VS3–TM2 for rotation in either direction. This is accomplished by providing means for switching the power supply from one position, wherein it energizes the first motor winding directly and energizes the second motor winding through a phase-shifting capacitor and resistor network; to another position, wherein it energizes the second motor winding directly and energizes the first winding through the said phase-shifting capacitor and resistor network. It is well known in the art that this reversal of connections produces oppositely rotating flux fields within the motor windings. In order to accomplish the necessary flip-flop connections, the cancelling relays are provided with flip-flop contacts such as VS1–RX6, which is normally open, and VS1–RX7, which is normally closed. The operation of this circuitry will be made more clear presently.

The cancelling and substituting function breaks down into three categories, as mentioned previously, namely: (1) cancelling and substituting; (2) cancelling only; and (3) adding code only. The operation of the control circuitry is identical in each case and a single example is deemed to satisfactorily illustrate the operation. A case wherein it is desired to cancel one of the code groups appearing in the visible storage section and replace it with one or more code groups is described hereinbelow.

Assuming that the code group to be cancelled is occupying the first level of the visible storage section, the procedure is as follows. The operator depresses cancelling push button XPB1 to pick up relay VS1–RX. This causes flip-flop contacts VS1–RX1 and VS1–RX2, associated with torque motor VS1–TM1, to reverse their position and also closes contact VS1–RX3 to complete the power supply circuit for motor VS1–TM1. Torque motor VS1–TM1 rotates counterclockwise to dump the code group occupying the first level of the visible storage section. At this point it should be noted that an additional contact VS1–RX5, which is opened upon the picking up of relay VS1–RX, serves to isolate torque motor VS2–TM1, and thus the code group at the second level is prevented from cascading even though the first level is now unoccupied.

As the code station cylinder 161 associated with torque motor VS1–TM1 begins to rotate, micro-switches VS1–MS1 and VS1–MS2 are cammed closed, VS1–MS2 causing cam relay VS1–CR to pick up. Relay VS1–CR, upon picking up, opens contact VS1–CR1 thus turning over the power supplying function for torque motor VS1–TM1 to micro-switch VS1–MS1. In addition, contact VS1–CR2 closes and is held up though contact VS1–RX4 which remains closed so long as push button XPB1 is depressed. Therefore, the code station cylinder makes only one revolution and is stopped by micro-switch VS1–MS1.

Simultaneously, with the picking up of relay VS1–RX, the following sets of contacts will flip-flop: VS1–RX6 and VS1–RX7, associated with torque motor VS1–TM2, which drives the transfer cylinder 231 associated with the first level of the visible storage section; contacts VS1–RX8 and VS1–RX9, associated with torque motor VS2–TM2, which drives the transfer cylinder 226 associated with the second level of the visible storage section; and contacts VS1–RX10 and VS1–RX11, associated with torque motor VS3–TM2, which drives the transfer cylinder 135 associated with the third level of the visible storage section. Therefore, a circuit is established through contact VS1–RX6 and micro-switch VS1–MS3 to energize torque motor VS1–TM2, and after this motor drives transfer cylinder 231 through 100 degrees, micro-switch VS1–MS3 is cammed open, thus isolating torque motor VS1–TM2 from its power supply and stopping it after 100 degrees of rotation. Similarly, torque motors VS2–TM2 and VS3–TM2 are stopped after 100 degrees of rotation.

The code group or groups to be substituted for the cancelled code group are now selected, verified, and conducted through the transfer cylinders 135, 226, and 231 until they reach the first level of the visible storage apparatus. The routing path may be followed by referring to Fig. 5 and noting that all three of the transfer cylinders have been rotated approximately 100 degrees counterclockwise from the positions shown. During the substitution procedure, it is necessary to maintain push button XPB1 depressed, and only after the substituting is completed is the push button released to drop out relay VS1–RX. The dropping out of relay VS1–RX causes the following pairs of contacts to flip-flop: contacts VS1–RX6 and VS1–RX7; contacts VS1–RX8 and VS1–RX9; and contacts VS1–RX10 and VS1–RX11. Thus the transfer cylinder 231 associated with the first level of the visible storage section returns to its original position by reason of torque motor VS1–TM2 being energized through contact VS1–RX7 and micro-switch VS1–MS4. The torque motor is de-energized after 100 degrees of travel since micro-switch VS1–MS4 is cammed open at that point. Similarly, the transfer cylinders of the second and third levels of the visible storage section will return to their initial positions.

The dropping out of relay VS1–RX closes contact VS1–RX5 in the motor supply circuit of torque motor VS2–TM1 and permits normal cascading to take place whenever sensing coil 163 is unoccupied.

In the preceding example, however, the substituted code group or groups are present at the first level of the visible storage section and therefore no cascading occurs until the last group has departed.

*Blind storage code revisions*

In certain instances it becomes evident that one or more of the code groups stored in the blind storage section of the apparatus must also be cancelled. According to the present invention, an electrically operated reminder switch is employed to indicate the arrival of the code group at the visible storage section of the apparatus. When the code group arrives in the visible storage section and is identified, the necessary cancelling operation may be performed in the manner previously described.

The reminder switch 247 is mounted on the console of Fig. 7 and controls of the circuit of Fig. 28 to actuate a warning bell. The reminder switch includes a stepping contact arm 385 adapted to successively contact a series of arcuately arranged contact buttons. The contact buttons are numbered in accordance with the dial that surrounds the reminder switch 247 on the console. Certain of the contact buttons are connected in series with normally open contacts labelled C5, C10, C15, etc., and these contacts are controlled by the reminder switch. If the reminder switch 247 on the console is positioned on dial numeral 15, normally open contact C15 closes. The contact arm 385 advances one step each time stepping switch relay SSR picks up. Relay SSR is energized by the closing of a track relay contact ATR3 which in turn is picked up each time a car or cut of cars passes over the approach section 101 of the main track switch. Thus a warning bell 386 is fed by a circuit from conductor 355 through contact arm 385, the contact button engaged by the contact arm and the lead lines in which the normally open contacts are located to return conductor 356.

After the destinations for the entire train have been stored in the present apparatus and it is determined, for example, that the twenty-fifth cut of cars must be rerouted from track 2 to track 6, the reminder switch 247 on the console is set on dial position 25. At the same time, the contact arm 385 is returned to the fourth contact button which is the normal or home position and is the only position in which the homing contact 388 is open.

The operation of the circuitry of Fig. 28 is initiated by the passage of the cars over the approach section 101. As each cut passes the approach section, the track relay ATR (not shown) picks up and closes contact ATR3 to complete an energization circuit for stepping switch relay SSR. Each time this relay is energized, it advances the contact arm 385 one step, and thus when the first cut passes over the approach section, the contact arm will move from position 4 to position 5. When the second and subsequent cuts pass the approach section, they, too, through the action of relay SSR, cause the contact arm 385 to advance one step until finally, with the passing of the twenty-first cut over the approach section, the contact arm will arrive at the contact button that is electrically connected to the closed contact C25. This completes a circuit that energizes the warning bell 386 and alerts the operator to the approach of the tweney-fifth code group. When the code group finally reaches the visible storage section, it may be cancelled and replaced, as previously described.

Means are provided for automatically returning the contact arm 385, and this is accomplished by means of a homing button 387 that is in series with a normally closed back contact SSR1 of relay SSR. When it is desired to home the contact arm, the homing button 387 is depressed to complete a circuit from conductor 355 through relay SSR, contact SSR1, homing button 387, and conductor 356. When relay SSR picks up, it moves the contact arm 385 one position. Simultaneously, it opens its own contact SSR1 and drops out. As soon as it drops out, contact SSR1 again closes and picks up relay SSR. Thus it again moves the contact arm one position and simultaneously opens contact SSR1. This process continues and the homing button permits the return to be accomplished in a matter of seconds.

*Full blind storage indicator and lockout*

It is always possible that a train to be classified will be of such great length that the number of code groups required to store the destination of the many cuts of cars involved will exceed the physical capacity of the storage apparatus. In order to warn the operator when the capacity of the device has been reached, a full code alarm is provided on the pilot channel blind storage tube. This alarm is controlled by the sensing coil 137 that is telescoped over the top end of the pilot channel blind storage tube so that when the storage capacity has been reached, a steel pilot ball will be within the central portion of the sensing coil. The sensing coil is in a resonant circuit, as shown in Fig. 29, the detailed operation of which has already been fully described with reference to Fig. 24. At this point it should be noted that the swift passage of a pilot ball each time that a code group travels through the blind storage tubes is so momentary in character that the relay LOR associated with the full storage sensing coil 137 is not actuated.

When, however, the storage capacity has been reached and one of the pilot balls is maintained within the sensing coil, it causes relay LOR to pick up. The picking up of relay LOR opens contact LOR1, located in the push button code selector circuit of Fig. 22, and prevents the operator from selecting any more codes.

Referring now to Fig. 30, there is shown a circuit diagram which is also controlled by relay LOR. This circuit includes a full storage buzzer 389 and a full storage light 246. There is, in addition, an auxiliary relay AR which permits the operator, upon detecting the indication of either the buzzer or the light, to depress the full storage push button 245 and turn off the buzzer 389.

When relay LOR picks up, it closes contact LOR2 thus establishing a circuit from conductor 354, on the one hand, through warning light 246, and, on the other hand, though normally cloced contact AR2 and the full storage warning buzzer 389. The operator then depresses the full storage push button 245 to pick up relay AR and close contact AR1, thus maintaining relay AR energized as long as contact LOR2 is closed. In addition, relay AR opens contact AR2 and disconnects the warning buzzer 389. As the cars proceed over the hump and the stored code groups advance through the apparatus, the full storage sensing coil will be vacated and cause relay LOR to drop out. When relay LOR drops out, contact LOR1 restores power to the selector circuit of Fig. 22 and contact LOR2 opens to disconnect the full storage warning light 246 and cause relay AR to drop out.

*Control section*

A typical circuit unit of the type that is associated with each of the code station cylinders of the control section is shown in Fig. 31. Each of these circuit units contains two resonant circuit portions. One is associated with the sensing coil of the pilot channel and the other is associated with the sensing coil of one of the code channels. The upper or pilot channel resonant circuit is of the standard type shown in Fig. 24 and its operation has been fully described hereinbefore. The lower or code channel resonant circuit is of this same general type but includes additional refinements which greatly improve the functioning of the control section. One such refinement is the inclusion of a shunting resistor 391 that is bridged across the resonant circuit defined by the sensing coil and trimmer capacitor, and the arrangement is such that the impedance value of the shunting resistor 391 is substantially equal to the impedance of the resonant circuit when in its resonant condition. This bridging circuit is automatically switched into the thyratron tube biasing circuitry, as is explained hereinafter.

Also included in the circuit unit diagram of Fig. 31 are the track switch control magnets L and R. Magnet L is adapted upon being energized to throw the track switch to its left-hand position, and magnet R is adapted upon being energized to throw the track switch to its right-hand positions, the positions right-hand and left-hand being determined by standing at the hump 100 and facing the receiving tracks. Additionally, this diagram includes a control relay KR adapted to be picked up by a set of normally open contacts KTR4 that are controlled by a track relay KTR. The track relay KTR in turn is actuated by a track detector circuit 393 of the well-known type that is usually associated with each of the switch points in a clasification yard. Fig. 31 also includes motor control circuitry for the torque motor KTM1 which is associated with a rotatable code station cylinder. Each of the cylinders of the control section is formed with two flat cam surfaces that control micro-switches KMS1 and KMS2. The arrangement is such that when the cylinder is in its normal position, namely with the flat cam surfaces facing downwardly, both of the micro-switches are open, and when the cylinder begins its rotation, micro-switch 1 closes shortly before micro-switch 2. Adjacent the end of the cycle of rotation, the micro-switches are cammed open, and micro-switch 2 opens shortly before micro-switch 1.

In order to best explain the operation of the control circuitry of Fig. 31, it is convenient to consider each of a variety of possible operating conditions, and these fall into two broad categories. The first category is concerned with situations in which not only do the successive code groups that arrive at the various stations in the control section of the apparatus depart before the next successive code group arrives, but also the associated cut being clasified clears the track detector section before the next successive code group arrives. The second category is concerned with situations in which the successive code groups are piled up on top of the code group that is within the sensing coils and is controlling the cut passing through the track switch associated with the particular control station. Thus, in the second category the next code group drops into the sensing coils long before the first cut clears the associated track detector circuit. Each of these categories includes four situations that may be described in terms of the characteristic of the ball in any given code channel; that is, steel ball or glass ball, it being remembered that at all times the ball in the pilot channel is steel. The four situations are: (A) glass ball following glass ball; (B) steel ball following glass ball; (C) glass ball following steel ball; and (D) steel ball following steel ball.

*1A—Glass ball follows glass ball.*—In examining this situation, it is necessary to consider the condition of the circuit after a code group having a glass ball in the code channel sensing coil has departed and its associated cut has cleared the track detector circuit. At this time the switching machine for the track switch is in its right-hand position, it having been so positioned by the glass ball in the immediate preceding code group. Accordingly, contacts SM1 and SM4 of the switch machine are closed and contacts SM2 and SM3 are open. The switch machine operating magnet R is energized by a circuit from conductor 354 through contacts KRA1 and KTR1 to rectifier 394 and conductor 355, and thus the switch machine is maintained in its right-hand position. The switch position indicating light RTL is lit by a circuit from conductor 355, rectifier 395, through contacts SM4, KTR2, and KRA4, to conductor 356. The track relay KTR is energized, there being no car in the track detector section. Hence, relays KR and KCR are also de-energized. Also, relays KRP and KRA are de-energized, there being no code balls within the various sensing coils.

It will now be assumed that a steel ball and glass ball are deposited in the pilot channel and code channel sensing coils respectively. Relay KRP picks up to close contact KRP1 and light indicator light CGL on the console. The glass ball in the code channel sensing coil is ineffective and relay KRA remains de-energized.

The circuit remains in the condition outlined above until the car represented by the code group arrives at the track detector circuit associated with the track switch corresponding to the control unit in question. At that time, track relay KTR drops out and opens contacts KTR1 and KTR2, thereby taking the control of the L and R relays away from the code channel relay KRA and transferring this control, by the simultaneous closing of contact KTR3, to the contacts of the switch machine. Magnet R remains energized by a circuit from conductor 354 through contacts KTR3 and SM1 to conductor 355.

The dropping out of track relay KTR also causes contact KTR4 to close and pick up relay KR. The picking up of relay KR energizes the power supply circuit for torque motor KTM1 by closing contact KR1. The circuit extends from conductor 351 through contacts KR1, KCR1, and KRA6 to conductor 352. As the torque motor begins to rotate the associated code station cylinder, micro-switch KMS1 is cammed into closed position, and shortly afterwards micro-switch KMS2 closes to pick up relay KCR which remains picked up independently of micro-switch KMS2 through contacts KR2 and KCR2. The picking up of relay KCR immediately opens contact KCR1 thus taking control of the torque motor away from the KR relay and giving it exclusively to KMS1. When the cylinder completes its cycle of revolution, KMS1 opens and stops the torque motor. KMS2 also opens but relay KCR remains energized through contacts KR2 and KCR2. As soon as the cut of cars has cleared the detector section, track relay KTR picks up thereby opening contact KTR4 and causing relay KR to drop out. With the dropping out of relay KR, contact KR2 opens and drops relay KCR. Contact KCR1 then recloses and reestablishes the starting circuit for the torque motor. It should also be noted that when the track relay picked up, it also restored contacts KTR1, KTR2, and KTR3 to their original positions, and therefore magnet R is still maintained energized.

Thus the operation of the circuitry for the case of a glass ball following a glass ball is relatively simple. The circuit is arranged so that the track switch remains in the position to which it was last thrown until such time as a code ball of opposite aspect arrives and causes it to reverse its position. It is desirable that the number of switch operations be held to a minimum.

*1B—Steel ball follows glass ball.*—In this situation the circuit conditions are identical with those of case 1A, and a steel ball is deposited in both the pilot channel and code channel sensing coils. Therefore, both relay KRP and KRA will pick up and the picking up of relay KRA causes contacts KRA1, KRA2, KRA3, and KRA4 to flip-flop and shift the track switch from its right-hand position to its left-hand position by de-energizing magnet R and energizing magnet L. The above flip-flop will also transfer the light indication from RTL to LTL. Contacts KRA5 and KRA6 also flip-flop and set up the motor supply circuit for reverse rotation of the motor. Contacts KRP2 and KRA8, which are in the resonant circuit associated with the code channel, also reverse positions.

Assuming that the car or cut of cars being classified arrives at the track detector circuit, relay KTR drops out thus taking control of the switch machine magnets R and L away from the KRA relay and simultaneously picking up relay KR to close the power supply circuit for counterclockwise rotation of the torque motor through contacts KR1, KCR1, and KRA5. As the motor begins to rotate the cylinder, micro-switch KMS1 first closes and then micro-switch KMS2 closes to pick up relay KCR, as prepreviously described. It should be noted that as the cylinder rotates and the code group is deposited therein, the sensing coil of the code channel is vacated and the series resonant circuit returns to its condition of resonance. If this resonant condition were permitted to cause relay KRA to drop out, the contacts KRA5 and KRA6 in the motor supply circuit would flip-flop and the motor would attempt to reverse itself in the middle of its cycle of rotation. To prevent this, a normally closed set of contacts KCR3 is inserted in series with the code channel sensing coil so that when relay KCR picks up, the KCR3 contacts create an open circuit. In effect, the open circuit simulates the presence of a steel ball within the sensing coil. A steel ball detunes the circuit and creates a high impedance path which reduces the current flow through the potentiometer 366 and reduces the bias on the thyratron tube. An open circuit has the same effect in reducing the bias on the thyratron tube and, therefore, may be said to simulate a steel ball within the sensing coil.

At the moment that the steel balls drop out of the sensing coils, relay KRP drops out and opens contact KRP2, but relay KRA remains picked up because of the open circuit created by the contacts KCR3. Contact KRA8 also stays open so that when and if contact KCR3 closes, an open circuit is still maintained. Therefore, the cylinder will complete its cycle of rotation and open micro-switches KMS1 and KMS2.

When the cut of cars finally clears the track detector circuit, contact KTR4 opens to de-energize relay KR and open contacts KR1 and KR2. The opening of KR2 drops out relay KCR and opens contact KCR3. The picking up of track relay KTR due to the departure of the cut of cars being classified also restores control of the switch machine operating relays to the relay KRA, which is now held picked up. Thus, the cooperation of contacts KRP2, KRA8, and KRC3 permits the code channel resonant circuit to maintain its detuned condition and, therefore, to maintain the track switch in its left-hand position, which was the position directed by the preceding code group. Here again the circuitry of Fig. 31 causes the track switch to remain in the position that the previous code group had caused it to assume and this is maintained until the next code group arrives.

*1C—Glass ball follows steel ball.*—In this situation the circuit conditions are identical with those of case 1B and a steel ball is deposited in the pilot channel and a glass ball in the code channel. Relay KRP of the pilot channel picks up and closes contact KRP2 and restores the control of the code channel relay to the sensing coil. Due to the presence of a glass ball in the code channel sensing coil, the series resonant circuit is in its resonant condition and a sufficient bias is built up on thyratron tube T to cause relay KRA to drop out. When this occurs, contact KRA8 closes and contacts KRA1, KRA2, KRA3, and KRA4 flip-flop. The reversing of these latter contacts de-energizes switch machine magnet L and energizes switch machine magnet R, thereby throwing the track switch from its left-hand position to its right-hand position. The circuit condition is now identical with that outlined in case 1A.

*1D—Steel ball follows steel ball.*—In this situation the circuit conditions are identical with those of case 1B and a steel ball is deposited in both the pilot channel and code channel. Upon the arrival of the steel pilot ball and steel code ball, relay KRP picks up to close contact KRP2. However, in the present instance the steel code ball detunes the series resonant circuit and maintains relay KRA picked up and contacts KRA7 and KRA8 open. The track switch remains in its left-hand position because relay KRA is still picked up, and contacts KRA1 and KRA4 are open and contacts KRA2 and KRA3 are closed. The circuit conditions in all respects become similar to those described in case 1B.

*2A—Glass ball follows on top of glass ball.*—In this category the problem arises due to the fact that the subsequent code group is deposited within the sensing coils immediately after the original code group has vacated these same coils. The problem involved is to prevent the second code group from exercising any influence until after the first code group has been directed to the appropriate succeeding control unit and also until after the cut of cars associated with the first code group has cleared the track switch. In the present situation it is assumed that a glass ball follows on top of a glass ball, and because each group attempts to control the circuitry in a similar manner, there is no tendency for the second group to countermand the directions of the first group and thereby interfere with the proper functioning of the circuit.

The only possible difficulty is that the code station cylinder might rotate more than once and thus cascade both code groups while only a single cut of cars was passing the track switch. It should be obvious, however, that KMS1 automatically opens after one cycle of rotation, and because contact KCR1 is then open, it is impossible to initiate another cycle of rotation even though relay KR is still picked up. In this connection it should be noted that relay KCR does not drop out until after relay KR.

*2B—Steel ball follows on top of glass ball.*—The problem in this situation is that the steel ball of the second code group drops into the sensing coil before the glass ball of the first code group has been transferred to the next successive control unit and the steel ball tends to reverse the direction of the torque motor. Since a steel ball is in the pilot channel and a glass ball is in the code channel, relay KRP is picked up and contact KRP2 is closed. Contact KCR3 is also closed to complete the series resonant circuit.

Because a glass ball is within the code channel sensing coil, relay KRA is de-energized and contacts KRA7 and KRA8 are closed.

As the car reaches the track detector circuit, track relay KTR drops out and closes contact KTR4 to pick up relay KR and energize the torque motor KTM1 through a circuit from conductor 351 through contacts KR1, KCR1, and KRA6. As the sensing cylinder rotates, micro-switches KMS1 and KMS2 close and the glass ball code group drops into the axial pockets of the sensing cylinder. The steel ball, which was resting on top of the glass ball, immediately drops into the code channel sensing coil and detunes the resonant circuit. It should be obvious that the steel ball tends to energize relay KRA and cause contacts KRA5 and KRA6 to flip-flop and reverse the direction of rotation of the torque motor, but this is prevented by the circuitry of Fig. 31. When micro-switch KMS2 closes, the KCR relay picks up and opens contacts KCR3 in the series circuit of the code channel resonant circuit and closes contact KCR4 to establish a parallel path from conductor 350 to contacts KRP2 and KRA8, both of which are closed. The resistor 391 in the parallel circuit is adapted to provide an impedance substantially equal to the impedance of the series resonant circuit when in its resonant condition, and this parallel circuit is adapted to be substituted in the biasing arrangement and simulate the resonant condition of the series resonant circuit.

The opening of contact KCR3 isolates the sensing coil and trimmer capacitor and, therefore, this portion of the circuit no longer exerts any controlling function, and the fact that the steel ball immediately follows the glass ball is of no concern. Due to the simulated resonant circuit condition, relay KRA remains de-energized and contact KRA6 remains closed to maintain the original direction of rotation. These circuit conditions persist until the cylinder has completed its cycle of revolution and permitted micro-switch KMS2 to open and also until the cut of cars has cleared the track detector circuit.

*2C—Steel ball follows on top of steel ball.*—This situation creates no difficulties because each group tends to cause the motor to rotate in the same direction, and the previous comments concerning case 2A are fully applicable, with the exception that the present situation is concerned with steel balls.

*2D—Glass ball follows on top of steel ball.*—In this situation there is originally a steel ball in both the pilot channel and code channel sensing coils and, hence, relays KRP and KRA pick up. Therefore, contacts KRA7 and KRA8 are open and contact KRP2 is closed.

As the car reaches the detector section, relay KR picks up thereby energizing the torque motor by a circuit from conductor 351 through contacts KR1, KCR1, and KRA5. As the cylinder begins to rotate, micro-switches KMS1 and KMS2 are closed, KMS2 picking up relay KCR, thereby opening contact KCR3 and closing contact KCR4. In this instance, however, contact KRA7, which was held open due to the presence of a steel bar in the code channel sensing coil, remains open and thus both the sensing coil circuit and its paralleling resistor circuit are isolated and the thyratron tube bias remains low. Therefore, relay KRA remains picked up, and though the rotation of the cylinder permits the steel bar to drop out, it is impossible for relay KRA to de-energize. This condition persists until the car clears the track detector section and drops out relay KR and, hence, relay KCR. At this point, contact KCR3 closes and the series resonant circuit is re-established. Thus the next code group is not permitted to exert any influence upon relay KRA until after the KCR relay has dropped out. This, of course, cannot occur until after one complete cycle of rotation of the sensing cylinder and also until after the car has cleared the track detector circuits.

The code channel resonant circuit of Fig. 31 also includes a pair of contacts designated TS1 and TS2, and these contacts are controlled by a transfer switch TS that is located at each switch point on the console. The purpose of the transfer switch is to override the control of the code channel sensing coil and, therefore, to manually control the routing of both the code group and its associated car independent of the aspect of the code ball that is deposited within the code channel sensing coil.

Fig. 32 illustrates the contact arrangements for each of the three positions which the transfer switch may assume. Thus, when it is desired to throw the track switch to its left-hand position, the transfer switch is set on position L. In that case, contact TS1 is closed and contact TS2 is open. A circuit is established from conductor 351 through relay KRA, contact TS1, and rectifier 396, to conductor 352, and relay KRA is energized at all times. This position of the transfer switch simulates a steel ball.

When it is desired to throw the track switch to its right-hand position, the transfer switch is placed on position R and contacts TS1 and TS2 are both open. When both contacts are open, relay KRA is isolated from its power supply and is de-energized at all times. Therefore, the right-hand position of the transfer switch simulates a glass ball in the sensing coil.

The third position of the transfer switch is the automatic position, and the contacts are in the positions shown in Fig. 31. In this position the code balls control the condition of energization of relay KRA.

Provision is also made for simulating the passage of a car over the track detector circuit and this is accomplished by means of push button SPB which is adapted, upon being depressed, to pick up relay KR. It sometimes happens that successive cuts of cars become coupled together and thus pass through the switch yard as if they were a single cut of cars. In these instances the code group associated with the second cut of cars must be progressed through the apparatus manually, and this is done by actuating the push buttons SPB associated with each of the track switches and successively cascading the undesired code group out of the apparatus.

SUMMARY OF OPERATION

The destination for each of the many cuts of cars is recorded and stored in the present apparatus by means of permutational code groups consisting of free rolling mechanical elements each having one of two distinctive physical characteristics, specifically steel balls and glass balls. A steel ball is adapted to throw a track switch to its left-hand position and a glass ball is adapted to throw a track switch to its right-hand position. The code groups consist of five elements, one for each of the four switch levels in the classification yard, plus a pilot ball, and the makeup of the groups is indicated by the chart of Fig. 4 in which the blank squares indicate glass balls and the X's indicate steel balls. It may be seen that in every case, the pilot ball is made of steel. As best seen in Fig. 6, the apparatus consists of five parallel vertical channels within which the code group is advanced from station to station by means of gravity.

If it is desired to form a code group corresponding to receiving track No. 3, push button PB3, shown on the console of Fig. 7, is depressed, and as shown in Fig. 22, push button PB3 closes a circuit to pick up relay 3CAR. The picking up of relay 3CAR closes contacts 3CAR1 to 5, shown in Fig. 23, and energizes solenoids 122, 123D, 123C, 122B, and 122A. Solenoids 122, 122B, and 122A actuate selector shuttles 118, 118B, and 118A, respectively, to deposit a steel ball in each of funnels 117, 117B, and 117A. Solenoids 123D and 123C actuate selector shuttles 119D and 119C, respectively, to deposit a glass ball in funnels 117D and 117C.

The thus formed code group drops into the verifier sensing unit 126, shown in Fig. 5, contacts the surface of the verifier cylinder 127, and while supported thereby, is disposed within the sensing coils 130. The sensing coils 130 of the verifier unit are shown in Fig. 24 and are adapted to control the relays VRP, VRD, VRC, etc., the contacts of which form the relay tree circuit of Fig. 25. The arrangement is such that the steel balls in the pilot channel and in code channels A and B pick up relays VRP, VRB, and VRA to close contacts VRP1, VRA1, and VRB1 in the relay tree circuit of Fig. 25. This completes a path to energize light VL3 and relay 3CCR. The light VL3 is on the console of Fig. 7 and indicates to the operator that the right arrangement of steel balls corresponding to receiving track 3 has been selected and deposited in the code channels.

Simultaneously, the contacts of relay 3CCR set up a power supply circuit for the verifier unit torque motor VTM. This circuit is shown in Fig. 26 and is effective to deliver the code group from the funnels 117 to the tubes 132 that depend from the verifier unit. As the verifier cylinder 127 is rotating to deliver the code group to the tubes 132, the mechanical fingers 293, shown in Figs. 16 and 17, test the pockets to insure that a code ball has been deposited in each. This provides a check for the glass balls of the code group, and if they are all present, the fingers 293 glide harmlessly over the surfaces of the balls and the code group is delivered to the tubes 132, as previously described.

In the event that the arrangement of the steel balls is incorrect or that one of the glass balls is missing, the cylinder 127 reverses its direction of rotation and discards the erroneous code group into the collecting hopper 214. The direction of rotation of the verifier cylinder is controlled by the condition of energization of relay WCR, shown in Fig. 26, and this in turn may be altered by the opening of either contact FCCR1 or contact DR1.

After passing through the verifier unit, the code group is conducted into the blind storage section which consists of the tubes 138, 138D, 138C, etc. The first code group travels through the blind storage tubes and arrives at code station 139, which constitutes the fourth level of the visible storage section. The steel pilot ball is disposed within sensing coil 141 and, as shown in Fig. 27A, picks up relay VS4–RP to close contact VS4–RP1 and energize torque motor VS4–TM1. This torque motor drives cylinder 140 countercloskwise and cascades the code group from the fourth level to the third level where the process is repeated until the code group reaches the first level where it is held. Similarly, the second, third, and fourth code groups are held at the second, third, and fourth levels of the visible storage section. The cascading of the second code group is stopped at the second level because the steel pilot ball in sensing coil 163 of the first level picks up relay VS1–RP and opens contact VS1–RP3 in the motor supply circuit of the second level of the visible storage section. The display panel 165 on the console of Fig. 7 provides an indication of the destination of each code group in the visible storage section. The remaining code groups pile up in the blind storage tubes after passing through the verifier section. The apparatus remains in this condition until the cars pass over the approach section and actuate relay ATR, not shown.

As the first car passes the approach section 101, shown in Fig. 2, contacts ATR1 and ATR2 of Fig. 27B close and torque motor VS1–TM1 is energized to drive cylinder 161 of the first level of the visible storage section clockwise and cascade the first code group into the control section of the apparatus. As the first code group leaves the sensing coils 163, the subsequent code groups advance one position.

When the first code group arrives at the first station 168 of the control section of the apparatus, the pilot channel ball is deposited in sensing coil 171 and the A channel ball is deposited in sensing coil 171A. If the A channel code ball is steel, relay KRA picks up and positions the track switch SW1–8 to the left by opening contact KRA1 and closing contact KRA3 to energize magnet L. The first code group remains in the first station until the first car reaches the track detector circuit associated with the main track switch SW1–8 and drops out relay KTR. The dropping out of relay KTR transfers control of main switch SW1–8 from sensing coil 171A and closes contact KTR4 to pick up relay KR. The picking up of relay KR closes contact KR1 and energizes torque motor KTM1 to drive cylinder 169 clockwise and deliver the code group to cylinder 181, which corresponds to track switch SW1–4.

When the first car clears the first track detector circuit, relay KTR picks up and restores the control of the first track switch to sensing coil 171A, and when the second code group arrives, the A channel code ball once again positions the main track switch as required. The operation in the second level of the control section is similar to that already described except that the B channel code ball positions the track switch. Similarly, in the third level the C channel code ball positions the track switch, and finally the D channel code ball positions the track switches of the fourth level. Thus the code group advances through the apparatus in timed relationship with the progress of the cars through the track layout.

The progress of the cars through the classification yard may be observed directly and the progress of the code groups through the apparatus is indicated on the console by the lights CGL, which are located at each station.

It should be apparent that the inclusion of a pilot channel is an important advantage of the preferred form. The sensing coils must perform a twofold function in order to react to the code groups passing through the machine. First of all, they must sense the presence of a code ball, and secondly they must discern whether the code ball is glass or steel. Providing a single sensing coil which performs both of these functions is a difficult problem requiring sensitive equipment that is frequently difficult and costly to maintain in proper working order. In the present arrangement the presence of a code ball is announced by the pilot ball that is associated with each code group, and therefore the sensing coil need only determine the characteristics of the code ball, i.e., steel or glass. This permits sensing devices of a considerably simplified and more durable design and construction to be profitably employed.

It is not infrequently necessary to revice the routings of some of the cars whose destinations are already stored in the apparatus, and in the present invention this is accomplished in the visible storage section. The push buttons XPB1, 2, and 3, shown on the console of Fig. 7, are operatively connected in the circuitry of Figs. 27A and B. Assuming that the code group in code station 153, which is located in the second level of the visible storage section, must be revised, push button XPB2 is depressed to pick up relay VS2–RX and energize torque motor VS2–TM1. The picking up of relay VS2–RX flip-flops its contacts and causes the torque motor to rotate clockwise to discard the undesired code group into the collecting hopper 214.

Simultaneously, torque motors VS3–TM2 and VS2–TM2 drive transfer cylinders 135 and 226 approximately 100 degrees counterclockwise to set up a path from the verifier unit 126 through tubes 132, transfer station 134, tubes 224, transfer station 225, tubes 299, and transfer station 230 to the tubes 151 which feed the code station 153. A new code group corresponding to the revised routing is now selected, checked in the verifier and guided into the code station 153. When this is completed, push button XPB2 is released and the transfer cylinders return to their normal positions, shown in Fig. 5. The system then functions in the usual manner.

When the code elements fall into the collecting hopper 214, whether due to having passed through the apparatus in performing their controlling function or whether due to having been discarded by a code station in the verifier or visible storage section, they are automatically guided into the return conveyor 102 and elevated into the return hopper 104. The return hopper feeds the mixed code balls to a magnetic separator 107 which deposits the glass balls in reservoir 112 and the steel balls in reservoir 111 where they are maintained until selected and formed into the permutational code groups.

Thus it may be seen that the objects of this invention have been accomplished in that a control apparatus has been provided for an automatic switching system in which the control intelligence is represented by code groups of mechanical elements of distinctive physical characteristic, preferably metallic and non-metallic balls; mechanical fingers cooperate with an electrical sensing device to verify that the selected code groups are complete and correctly arranged; blind storage tubes are provided to afford an unlimited amount of storage capacity; the cascading elements in the visible storage section are reversible to permit undesired code groups to be cancelled; the transfer devices are reversible to permit additional codes to be inserted and towards this end are adapted to feed the codes either to the blind storage section or through a substituting arrangement to any desired point in the visible storage section; and the control units are coordinated with the track switches and with the track detector circuits to permit the codes to successively position the track switches and to permit the track detector circuits to coordinate the advance of the code groups through the apparatus with the progress of the car through the classification system.

While the system generally was developed to overcome switching problems in the railroad art and finds particular application in the case of classification yards, it will be noted that certain portions of the system are applicable to any type of apparatus for handling groups of mechanical elements. In particular, the visible storage section and the cancelling and substituting arrangement are believed to find general application to any type of device in which intelligence is stored in the form of mechanical elements. In addition, the verifier section and certain of the constructional features, such as the resonant circuit sensing devices, the pre-drop feature, and the concept of employing a pilot element to facilitate the detection of code groups in which the elements are of distinctive physical characteristics, find application in many forms of apparatus for handling mechanical elements.

It is contemplated that the rotatable cylinders for progressing the code elements through the system may be replaced by shuttle bars having a series of pockets and that these bars may be actuated by opposed solenoids to provide the necessary reversibility. An arrangement embodying shuttle bars actuated by solenoids has the advantage of being more economical to construct than is the preferred form, which employs the rotatable cylinder and reversible torque motors. The remainder of the mechanical portion of the apparatus, that is, the connecting tubes, selector section, conveyors, etc., should be substantially the same. Similarly, the sensing circuits could be identical. The various electrical control circuits could also be considerably simplified.

It is also contemplated that instead of arranging the permutational code groups in parallel channels such as is disclosed in connection with the multiple tube system of the apparatus, they might also be arranged serially in a single tube. The specific apparatus would necessarily be somewhat different in order to convey the serial code groups from station to station in the apparatus and in order to detect the intelligence represented by the serial code groups, but the general system is within the scope of that outlined in connection with Fig. 1. In addition, a system employing serially arranged code groups is readily adaptable for use with apparatus employing selector shuttles operated by opposed solenoids instead of the rotatable cylinders.

It should be understood that the description of the preferred form of the invention is for the purpose of complying with Section 112, Title 35, of the United States Code and that the appended claims should be construed as broadly as the prior art will permit.

We claim:

1. In a mechanical code-handling system for storing codes in a prescribed order, said codes being in the form of a plurality of independent, discrete, flowable, mechanical bodies each having one of a plurality of distinctive physical characteristics, means forming a plurality of mechanical code stations, each station having flow-passage means formed with an inlet and an outlet for movement of said codes therethrough, conveying means including independent switching means for each station and flow-passage means successively connecting said stations for successively transmitting each code serially therethrough from the last station to the first station, said switching means of each station normally blocking movement of a code through the flow-passage means thereof and being actuatable for advancing a code from the inlet too the outlet thereof, individual slave-control means for each station except the first for actuating the switching means of such station, said slave-control means each including means responsive to the presence of a code at the immediately preceding station for rendering the same inoperative during the time when the immediately preceding station is occupied by a code, independent control means for actuating the switching means of the first station for discharging a code thereat, and sensing means including means for each station except the first responsive to the presence of a code at its associated station for actuating the slave-control means of such station.

2. In a mechanical code-handling system for storing codes in a prescribed order, said codes being in the form of mechanical bodies, means for storing a plurality of independent, discrete, flowable, mechanical bodies each having one of a plurality of distinctive physical characteristics, selecting means for said bodies for successively forming said codes and including discharge means successively delivering codes individually in said prescribed order, means forming a plurality of mechanical code stations, each station having flow passage means formed with an inlet branching into a sequence outlet and a discard outlet for selective movement of said codes therethrough, conveying means including independent switching means for each station and flow passage means successively connecting said selecting means and said stations for successively transmitting each code serially therethrough, with the outlet of said selecting means being connected to the inlet of the last of said stations and with the sequence outlet of each station being connected to the inlet of the immediately preceding station, said switching means of each station normally blocking the passage means thereof and being selectively actuatable to advance a code thereat, individual slave-control means for each station except the first for selectively actuating the switching means of such station to advance a code thereat to the sequence outlet thereof, said slave-control means each including means responsive to the presence of a code at the immediately preceding station for rendering the same inoperative during the time when the immediately preceding station is occupied by a code, independent control means selectively actuating the switching means of the first station for advancing a code thereat to the sequence outlet thereof, sensing means for each station except the first responsive to the presence of a code at its associated station for actuating the slave-control means of such station, and manually operable cancelling means for the switching means of each station for actuating such switching means to advance a code thereat to the discard outlet thereof.

3. In combination with the arrangement of claim 2, a transfer station intermediately in the flow-passage means connecting said selecting means and said last station, said transfer station having flow-passage means formed with an inlet branching into a sequence outlet and a substitution outlet, substitute conveying means for said transfer station including switching means normally establishing communication between the inlet and sequence outlet thereof, said last-named switching means being actuatable to terminate such normal communication and establish communication between the inlet and substitution outlet, said substitute conveying means also including flow-passage means connecting said substitution outlet selectively with one or more of the inlets of said mechanical code stations, and control means for actuating the switching means of said transfer station to its substitution position.

4. In a mechanical code-handling system for automatically forming and delivering verified codes, said codes being in the form of mechanical bodies, means for storing a plurality of independent, discrete, flowable, mechanical bodies each having one of a plurality of distinctive physical characteristics, selecting means for said bodies separately actuatable for selecting each code and including discharge means delivering such code individually, means forming a mechanical code-verifier station, said station having flow passage means formed with an inlet that branches into a sequence outlet and a discard outlet, means for receiving a verified code, conveying means including switching means for said station and flow passage means successively connecting said discharge means to the inlet of said station and the sequence outlet of said station to said receiving means for transmitting each code serially therethrough, said switching means normally blocking the flow passage means of said station and selectively actuatable to advance a code at said station, sensing means for said station responsive to the distinctive physical characteristic of a code thereat, control means including automatic comparing means responsive to continued actuation of said selecting means and responsive to said sensing means for comparing the code as represented by said sensing means with the code as represented by actuation of said selecting means for automatically actuating said switching means to advance the code to the sequence outlet when the code as represented by said sensing means corresponds with the code as represented by actuation of said selecting means and to advance the code to the discard outlet when the code as represented by said sensing means does not correspond with the code as represented by actuation of said selecting means.

5. In a mechanical code-handling system wherein each code is in the form of a permutational group that includes a mechanical pilot element and one mechanical code element, all of said elements being independent, discrete, flowable, mechanical bodies, with the pilot elements thereof having a common distinctive physical characteristic and with the code elements thereof having one of two preselected distinctive physical characteristics, handling apparatus for codes of the above character and comprising a mechanical code station for successively receiving said codes individually, said station having an independent flow passage for each element of a code, selectively actuatable means for said station, sensing means for said station and including a sensing unit for the pilot-element flow passage actuated in response to detection of the common distinctive physical characteristic of a pilot element in such passage, and a sensing unit for the code-element flow passage actuated in response to detection of one but not the other of the two possible distinctive physical characteristics of a code element in the code-element flow passage, and control means responsive to said sensing units, said control means responding upon actuation of said pilot-element sensing unit only to actuate said selectively actuatable means in one sense and responding upon actuation of both said sensing units to actuate said selectively actuatable means in the other sense.

6. In a mechanical code-handling system for storing codes in a prescribed order wherein each code is in the form of a permutational group that is comprised of a number of mechanical bodies, means for storing a plurality of independent, discrete, flowable, mechanical bodies each having one of a plurality of distinctive physical characteristics, selecting means for said bodies for successively forming said codes and including said number of discharge outlets for simultaneously delivering a code, means forming a plurality of mechanical code stations, each station having said number of flow passages each formed with an inlet conveying means including independent switching means for each station and flow-passage means successively connecting said stations for simultaneously transmitting a code serially therethrough, with the discharge outlets of said selecting means being individually connected to the inlets of the last of said stations and with the outlets of each station being individually connected to the inlets of the immediately preceding station, said switching means of each station normally blocking movement of a code therethrough through the flow passages thereof and being actuatable for simultaneously advancing a code from the inlets to the outlets thereof, individual slave-control means for each station except the first for actuating the switching means of such station, said slave-control means each including means responsive to the presence of a code at the immediately preceding station for rendering the same inoperative during the time when the immediately preceding station is occupied by a code, independent control means for actuating the switching means of the first station for discharging a code thereat, and sensing means including means for each station except the first responsive to the presence of a code at its associated station for actuating the slave-control means of such station.

7. In combination with the arrangement of claim 6, display means for each station and selectively actuatable for indicating the intelligence represented by a code thereat and wherein said sensing means includes means for each station responsive to the distinctive physical characteristic of the code thereat for selectively actuating the display means of such station.

8. In a mechanical code-handling system for storing codes in a prescribed order, said codes being in the form of a plurality of independent, discrete, flowable, mechanical bodies each having one of a plurality of distinctive physical characteristics, means forming a plurality of mechanical code stations, each station having flow-passage means formed with an inlet and an outlet for movement of said codes therethrough, conveying means including independent switching means for each station and flow-passage means successively connecting said stations for successively transmitting each code serially therethrough from the last station to the first station, said switching means of each station normally blocking movement of a code through the flow-passage means thereof and being actuatable for advancing a code from the inlet to the outlet thereof, individual slave-control means for each station except the first for actuating the switching means of such station, said slave-control means each including means responsive to the presence of a code at the immediately preceding station for rendering the same inoperative during the time when the immediately preceding station is occupied by a code, independent control means for actuating the switching means of the first station for discharging a code thereat, sensing means including means for each station except the first responsive to the presence of a code at its associated station for actuating the slave-control means of such station, and display means for each station and selectively actuatable for indicating the intelligence represented by a code thereat, said sensing means including means for each station responsive to the distinctive physical characteristic of the code thereat for selectively actuating the display means of such station.

9. In a mechanical code-handling system for storing codes in a prescribed order, said codes being in the form of a plurality of independent, discrete, flowable, mechanical bodies each having one of a plurality of distinctive physical characteristics, selecting means for said bodies for successively forming said codes and including discharge outlet means successively delivering codes individually in said prescribed order, means forming a plurality of mechanical code stations, each station having flow-passage means formed with an inlet and an outlet for movement of said codes therethrough, conveying means including independent switching means for each station and flow-passage means successively connecting said selecting means and said stations for successively transmitting each code serially therethrough, with the discharge outlet means of said selecting means being connected to the inlet of the last of said stations and with the outlet of each station being connected to the inlet of the immediately preceding station, said switching means of each station normally blocking movement of a code through the flow-passage means thereof and being actuatable for advancing a code from the inlet to the outlet thereof, individual slave-control means for each station except the first for actuating the switching means of such station, said slave-control means each including means responsive to the presence of a code at the immediately preceding station for rendering the same inoperative during the time when the immediately preceding station is occupied by a code, independent control means for actuating the switching means of the first station for discharging a code thereat, and sensing means including means for each station except the first responsive to the presence of a code at its associated station for actuating the slave-control means of such station.

10. The arrangement of claim 9 wherein the flow-passage means connecting said discharge outlet means to the inlet of said last station is elongated to form a high-capacity storage section and at the entrance thereof is provided with sensing means responsive to the sustained presence thereat of a code, and means actuatable by said last-mentioned sensing means for disabling said selecting means during the time that said last-mentioned sensing means detects a code.

11. In a mechanical code-handling system for storing codes in a prescribed order wherein each code is in the form of a permutational group that is comprised of a number of mechanical bodies, means for storing a plurality of independent, discrete, flowable, mechanical bodies each having one of a plurality of distinctive physical characteristics, selecting means for said bodies for successively forming said codes and including said number of discharge outlets for simultaneously delivering a code, means forming a plurality of mechanical code stations, each station having said number of flow passages each formed with an inlet branching into a sequence outlet and a discard outlet for selective movement of said codes therethrough, conveying means including independent switching means for each station and flow-passage means successively connecting said stations for simultaneously transmitting a code serially therethrough, with the discharge outlets of said selecting means being individually connected to the inlets of the last of said stations and with the outlets of each station being individually connected to the inlets of the immediately preceding station, said switching means of each station normally blocking movement of a code therethrough through the flow passages thereof and being actuatable for simultaneously advancing a code from the inlets to the sequence outlets thereof, individual slave-control means for each station except the first for actuating the switching means of such station, said slave-control means each including means responsive to the presence of a code at the immediately preceding station for rendering the same inoperative during the time when the immediately preceding station is occupied by a code, independent control means for actuating the switching means of the first station for discharging a code thereat, sensing means including means for each station except the first responsive to the presence of a code at its associated station for actuating the slave-control means of such station, and manually operable cancelling means for the switching means of each station for actuating such switching means to advance a code thereat to the discard outlets thereof.

12. In combination with the arrangement of claim 11, a transfer station intermediately in the flow passage means connecting said selecting means and said last station, said transfer station having said number of flow passages each formed with an inlet branching into a sequence outlet and a substitution outlet, substitute conveying means for said transfer station including switching means normally establishing communication between the inlets and sequence outlets thereof, said switching means being actuatable to terminate such normal communication and establish communication between the inlets and substitution outlets, said substitute conveying means also including flow-passage means connecting said substitution outlet selectively with one or more of the inlets of said mechanical code stations, and control means for actuating the switching means of said transfer station to its substitution position.

13. In a mechanical code-handling system for storing codes in a prescribed order, said codes being in the form of mechanical bodies, means for storing a plurality of independent, discrete, flowable, mechanical bodies each having one of a plurality of distinctive physical characteristics, selecting means for said bodies for successively forming said codes and including discharge means successively delivering codes individually in said prescribed order, means forming a plurality of mechanical code stations, each station having flow passage means formed with an inlet and an outlet for movement of said codes therethrough, conveying means including independent switching means for each station and flow passage means successively connecting said selecting means and said stations for successively transmitting each code serially therethrough from the last station to the first station, said switching means of each station normally blocking the passage means thereof and being actuatable to advance a code thereat from the inlet to the outlet thereof, individual slave-control means for each station except the first for selectively actuating the switching means of such station to advance a code thereat to the outlet thereof, said slave-control means each including means responsive to the presence of a code at the immediately preceding station for rendering the same inoperative during the time when the immediately preceding station is occupied by a code, independent control means selectively actuating the switching means of the first station for advancing a code thereat to the outlet thereof, sensing means for each station except the first responsive to the presence of a code at its associated station for actuating the slave-control means of such station, a transfer station intermediately in the flow-passage means connecting said selecting means and said last station, said transfer station having flow-passage means formed with an inlet branching into a sequence outlet and a substitution outlet, substitute conveying means for said transfer station including switching means normally establishing communication between the inlet and sequence outlet thereof, said last-named switching means being actuatable to terminate such normal communication and establish communication between the inlet and substitution outlet, said substitute conveying means also including flow-passage means connecting said substitution outlet selectively with one or more of the inlets of said mechanical code stations, and control means for actuating the switching means of said transfer station to its substitution position.

(References on following page)

References Cited in the file of this patent

UNITED STATES PATENTS

| | | |
|---|---|---|
| 1,008,862 | Poyet | Nov. 14, 1911 |
| 1,558,016 | Kiefer | Oct. 20, 1925 |
| 1,563,906 | Kleinschmidt | Dec. 1, 1925 |
| 1,890,740 | Marano | Dec. 13, 1932 |
| 2,074,351 | Zeigler | Mar. 23, 1937 |
| 2,081,035 | Graham | May 18, 1937 |
| 2,194,352 | Brixner et al. | Mar. 19, 1940 |
| 2,194,353 | Brown et al. | Mar. 19, 1940 |
| 2,216,610 | Culbertson | Oct. 1, 1940 |
| 2,254,814 | Angel | Sept. 2, 1941 |
| 2,275,436 | Holcomb | Mar. 10, 1942 |
| 2,298,939 | Griffiths et al. | Oct. 13, 1942 |
| 2,343,297 | Holcomb | Mar. 7, 1944 |
| 2,406,031 | Parker | Aug. 20, 1946 |
| 2,497,749 | Von Stoeser | Feb. 14, 1950 |
| 2,587,664 | Stout | Mar. 4, 1952 |
| 2,719,224 | Diamond | Sept. 27, 1955 |

FOREIGN PATENTS

| | | |
|---|---|---|
| 28,834 | Great Britain | of 1913 |

UNITED STATES PATENT OFFICE

CERTIFICATE OF CORRECTION

Patent No. 2,948,881 August 9, 1960

Roland J. Berti et al.

It is hereby certified that error appears in the printed specification of the above numbered patent requiring correction and that the said Letters Patent should read as corrected below.

Column 22, line 38, for "213" read -- 214 --; column 41, line 43, for "characteristics" read -- characteristic --; column 48, line 6, list of references cited, under UNITED STATES PATENTS, for "2,497,749" read -- 2,497,748 --.

Signed and sealed this 31st day of January 1961.

(SEAL)

Attest:

KARL H. AXLINE
Attesting Officer

ROBERT C. WATSON
Commissioner of Patents